(12) United States Patent
Englund et al.

(10) Patent No.: US 10,822,478 B2
(45) Date of Patent: Nov. 3, 2020

(54) POLYMER COMPOSITION AND CABLE WITH ADVANTAGEOUS ELECTRICAL PROPERTIES

(71) Applicant: BOREALIS AG, Vienna (AT)

(72) Inventors: Villgot Englund, Gothenburg (SE); Per-Ola Hagstrand, Stenungsund (SE); Annika Smedberg, Myggenas (SE); Ulf Nilsson, Stenungsund (SE)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 15/522,721

(22) PCT Filed: Oct. 27, 2015

(86) PCT No.: PCT/EP2015/074821
§ 371 (c)(1),
(2) Date: Apr. 27, 2017

(87) PCT Pub. No.: WO2016/066620
PCT Pub. Date: May 6, 2016

(65) Prior Publication Data
US 2017/0327674 A1 Nov. 16, 2017
US 2018/0148569 A2 May 31, 2018

(30) Foreign Application Priority Data
Oct. 27, 2014 (EP) ..................................... 14190492

(51) Int. Cl.
| C08L 23/06 | (2006.01) |
| C08K 3/013 | (2018.01) |
| H01B 3/44 | (2006.01) |
| C08L 23/08 | (2006.01) |
| C08K 3/22 | (2006.01) |
| C08K 3/34 | (2006.01) |
| C08F 2/02 | (2006.01) |
| C08K 5/14 | (2006.01) |
| C08L 71/02 | (2006.01) |
| C08F 2/38 | (2006.01) |

(52) U.S. Cl.
CPC ............... *C08L 23/06* (2013.01); *C08F 2/02* (2013.01); *C08K 3/013* (2018.01); *C08K 3/22* (2013.01); *C08K 3/34* (2013.01); *C08K 5/14* (2013.01); *C08L 23/0807* (2013.01); *C08L 23/0815* (2013.01); *C08L 71/02* (2013.01); *H01B 3/441* (2013.01); *C08F 2/38* (2013.01); C08L 2203/202 (2013.01); C08L 2207/066 (2013.01); C08L 2312/00 (2013.01)

(58) Field of Classification Search
CPC ......... C08L 2203/202; C08L 2207/066; C08L 23/06; C08L 23/0807; C08L 71/02; C08K 3/0033; C08K 5/14; H01B 3/441
See application file for complete search history.

(56) References Cited

U.S. PATENT DOCUMENTS

| 4,721,761 | A | * | 1/1988 | Omae | C08F 210/00 526/272 |
| 5,246,783 | A | * | 9/1993 | Spenadel | H01B 3/441 174/110 R |
| 5,539,075 | A | * | 7/1996 | Gustafsson | C08F 210/02 526/279 |
| 5,556,697 | A | * | 9/1996 | Flenniken | C08K 3/04 174/105 SC |
| 5,852,135 | A | * | 12/1998 | Kanai | C08F 283/06 525/398 |
| 6,231,978 | B1 | * | 5/2001 | Keogh | C08K 5/01 174/110 PM |
| 9,365,708 | B2 | * | 6/2016 | Nilsson | C08F 6/001 |
| 2001/0030053 | A1 | * | 10/2001 | Gadessaud | H01B 3/441 174/102 SC |
| 2002/0001715 | A1 | * | 1/2002 | Redondo | C08L 23/04 428/375 |

(Continued)

FOREIGN PATENT DOCUMENTS

| WO | 9308222 A1 | 4/1993 |
| WO | 9635732 A1 | 11/1996 |

(Continued)

OTHER PUBLICATIONS

International Search Report and Written Opinion of the International Searching Authority; PCT/EP2015/074821 dated Jan. 5, 2016.
Notification of Concerning Transmittal of International Preliminary Report on Patentability; PCT/EP2015/074821 dated May 2, 2017.
Mark et al., Encyclopedia of Polymer Science and Engineering, Ethylene Polymers, vol. 6 (1986), pp. 382-411.
Kilmesch et al., "Polyethylene: High-pressure", Encyclopedia of Materials: Science and Technology, 2001 Elsevier Science Ltd., pp. 7181-7184.

(Continued)

*Primary Examiner* — Timothy J Thompson
*Assistant Examiner* — Rhadames Alonzo Miller
(74) *Attorney, Agent, or Firm* — Insigne LLP

(57) ABSTRACT

The invention relates to a polymer composition comprising polyolefin (a), which is other than low density polyethylene (LDPE), and polyolefin (b), which is an LDPE polymer and obtainable by a high pressure process which process comprises the steps: (i) compressing one or more monomer(s) under pressure in a compressor, using a compressor lubricant for lubrication, (ii) polymerising a monomer optionally together with one or more comonomer(s) in a polymerisation zone, (iii) separating the obtained polyolefin (b) from the unreacted products and recovering the separated polyolefin in a recovery zone, wherein in step (i) the compressor lubricant comprises a non-mineral oil; a power cable, e.g. of a direct current (DC) power cable, use of a polymer composition and a process for producing a DC power cable.

13 Claims, No Drawings

(56) References Cited

U.S. PATENT DOCUMENTS

| | | | |
|---|---|---|---|
| 2002/0127401 A1* | 9/2002 | Perego | C08F 255/02 428/375 |
| 2003/0017328 A1* | 1/2003 | Inoue | C09J 9/02 428/328 |
| 2003/0149176 A1* | 8/2003 | Sekiguchi | C08L 23/0815 525/70 |
| 2004/0210002 A1* | 10/2004 | Haerkoenen | C08F 10/06 525/192 |
| 2006/0151758 A1* | 7/2006 | Reyes | C08K 5/34928 252/601 |
| 2007/0299173 A1* | 12/2007 | Wolfschwenger | C08L 23/12 524/148 |
| 2008/0315159 A1* | 12/2008 | Minagoshi | C08G 65/14 252/500 |
| 2009/0238957 A1* | 9/2009 | Clancy | C08L 23/02 427/117 |
| 2010/0222535 A1* | 9/2010 | Eaton | C08F 210/02 526/348 |
| 2010/0319959 A1* | 12/2010 | Eaton | C08L 23/06 174/110 SR |
| 2012/0273253 A1* | 11/2012 | Nilsson | C08F 6/001 174/120 SC |
| 2013/0199817 A1* | 8/2013 | Nilsson | C08L 23/06 174/102 SC |
| 2015/0291823 A1* | 10/2015 | Fu | C08K 3/36 428/375 |

FOREIGN PATENT DOCUMENTS

| | | |
|---|---|---|
| WO | 2006081400 A2 | 8/2006 |
| WO | 2009012041 A1 | 1/2009 |
| WO | 2009012092 A1 | 1/2009 |
| WO | 2011128147 A1 | 10/2011 |
| WO | 2014099543 A1 | 6/2014 |

OTHER PUBLICATIONS

Randall; "A Review of High Resolution Liquid 13Carbon Nuclear Magnetic Resonance Characterizations of Ethylene-Based Polymers"; Macromolecular Chemistry and Physics; vol. C29; (1989) pp. 201-317.

Brandolini et al., "NMR Spectra of Polymers and Polymer Additives", Marcel Dekker, Inc., New York 2000, pp. 31-39, 44-55, 60-65, 70-73, 78-111.

Berger et al., "200 and More NMR Experiments, A Practical Course", WILEY-VCH Verlag GmbH & Co. KGaA, Weinheim 2004, pp. 18-23, 48-53, 128-131, 144-149, 160-163, 302-305, 318-321.

Olsson, et al., "Experimental Determination of DC Conductivity for XLPE Insulation", Nordic Insulation Symposium 2009, Gothenburg, Sweden, Jun. 15-17, 2009, pp. 55-58.

* cited by examiner

POLYMER COMPOSITION AND CABLE WITH ADVANTAGEOUS ELECTRICAL PROPERTIES

FIELD OF INVENTION

The invention relates to a polymer composition and a power cable, which polymer composition and power cable, may be especially useful in high voltage (HV) and extra high voltage (EHV) cable applications, for example, high voltage direct current (HV DC) or high voltage alternating current (HV AC) applications and extra high voltage direct current (EHV DC) or extra high voltage alternating current (EHV AC) applications.

BACKGROUND

Polyolefins produced in a high pressure (HP) process are widely used in demanding polymer applications wherein the polymers must meet high mechanical and/or electrical requirements. For instance in power cable applications, particularly in medium voltage (MV) and especially in high voltage (HV) and extra high voltage (EHV) cable applications the electrical properties of the polymer composition has a significant importance. Furthermore, the electrical properties of importance may differ in different cable applications, as is the case between alternating current (AC) and direct current (DC) cable applications.

Crosslinking of Cables

A typical power cable comprises a conductor surrounded, at least, by an inner semiconductive layer, an insulation layer and an outer semiconductive layer, in that order. The cables are commonly produced by extruding the layers on a conductor. The polymer material in one or more of said layers is then normally crosslinked to improve e.g. heat and deformation resistance, creep properties, mechanical strength, chemical resistance and abrasion resistance of the polymer in the layer(s) of the cable. In crosslinking reaction of a polymer interpolymer crosslinks (bridges) are primarily formed. Crosslinking can be achieved using e.g. a free radical generating compound, such as a peroxide. Free radical generating agent is typically incorporated to the layer material prior to, or during, the extrusion of the layer(s) on a conductor. After formation of the layered cable, the cable is then subjected to a crosslinking step to initiate the radical formation and thereby crosslinking reaction.

Peroxides are very common free radical generating compounds used i.a. in the polymer industry for said polymer modifications. The resulting decomposition products of peroxides may include volatile by-products which are undesired, since they may have a negative influence on the electrical properties of the cable. Therefore the volatile decomposition products such as methane e.g. where, for example, dicumylperoxide is used, are conventionally reduced to a minimum or removed after crosslinking and cooling step. Such removal step is generally known as a degassing step. The degassing step is time and energy consuming and is thus a costly operation in a cable manufacturing process.

Also the used cable production line and desired production speed can bring limitations to the cable materials especially when producing power cables of a larger size.

Electrical Conductivity

The DC electrical conductivity is an important material property e.g. for insulating materials for high voltage direct current (HV DC) cables. First of all, the strong temperature and electric field dependence of this property will influence the electric field. The second issue is the fact that heat will be generated inside the insulation by the electric leakage current flowing between the inner and outer semiconductive layers. This leakage current depends on the electric field and the electrical conductivity of the insulation. High conductivity of the insulating material can even lead to thermal runaway under high stress/high temperature conditions. The conductivity must therefore be sufficiently low to avoid thermal runaway.

Accordingly, in HV DC cables, the insulation is heated by the leakage current. For a specific cable design the heating is proportional to the insulation conductivity×(electrical field)$^2$. Thus, if the voltage is increased, far more heat will be generated.

JP2018811A discloses an insulation layer for a DC cable which contains a blend of 2-20 wt % of a high density polyethylene with a low density polyethylene. It is stated that blend provides improved DC breakdown and an impulse property. The blend is mixed with 2-3 wt % of a crosslinking agent. The type and layer structure of the cable has not been specified.

There are high demands to increase the voltage of a power cable, e.g. of a direct current DC power cable, and thus a continuous need to find alternative polymer compositions with reduced conductivity. Such polymer compositions should suitably also have good mechanical properties required for demanding power cable embodiments.

DESCRIPTION OF THE INVENTION

The present invention relates to a polymer composition comprising
a polyolefin (a) which is other than low density polyethylene (LDPE), and
a polyolefin (b) which is an LDPE polymer,
wherein polyolefin (b) is obtainable by a high pressure process which process comprises the steps:
(i) compressing one or more monomer(s) under pressure in a compressor, using a compressor lubricant for lubrication,
(ii) polymerising a monomer optionally together with one or more comonomer(s) in a polymerisation zone,
(iii) separating the obtained polyolefin (b) from the unreacted products and recovering the separated polyolefin in a recovery zone,
wherein in step (i) the compressor lubricant comprises a non-mineral oil.

Unexpectedly, when said polyolefin (a), which other than LDPE, is blended to said polyolefin (b), which is an LDPE polymer and obtainable by a high pressure process comprising a non-mineral oil, the resulting polymer composition exhibits improved electrical properties compared to the electrical properties of the polyolefin (b) alone. Namely, the polymer composition of the invention has reduced, i.e. low, electrical conductivity. "Reduced" or "low" electrical conductivity as used herein interchangeably means that the value obtained from the DC conductivity measurements (1) and (2) as described herein under "Determination methods" is low, i.e. reduced. The low electrical conductivity is beneficial for minimising the undesired heat formation, e.g. in an insulation layer of a power cable, e.g. a DC power cable.

The low electrical conductivity makes the polymer composition very desirable for power cable applications. A power cable is defined to be a cable transferring energy operating at any voltage level, typically operating at voltage higher than 1 kV. The voltage applied to the power cable can be alternating (AC), direct (DC) or transient (impulse).

Moreover, the polymer composition is very advantageous layer material for an AC or DC power cable, which can be e.g. a low voltage (LV), a medium voltage (MV), a high voltage (HV) or an extra high voltage (EHV) AC or DC cable, which terms, as well known, indicate the level of operating voltage. The polymer composition may suitable be used in layer material for a HV power cable operating at any voltages, e.g. for a HV AC or DC power cable operating at voltages higher than 36 kV. For HV AC cables the operating voltage is defined herein as the electric voltage (RMS) between two conductors in the AC three-phase cable system. For HV DC cables the operating voltage is defined herein as the electric voltage between ground and the conductor of the high voltage cable. An exemplified cable is a HV DC power cable.

"Low density polyethylene", LDPE, is a polyethylene produced in a high pressure polymerization process. Typically the polymerization of ethylene and optional further comonomer(s) in the high pressure process is carried out in the presence of an initiator(s). The meaning of LDPE polymer is well known and documented in the literature. Although the term LDPE is an abbreviation for low density polyethylene, the term is understood not to limit the density range, but covers the LDPE-like high pressure (HP) polyethylenes with low, medium and higher densities. The term LDPE describes and distinguishes only the nature of HP polyethylene with typical features, such as different branching architecture, compared to the PE produced in the presence of an olefin polymerisation catalyst.

The polymer composition may suitably be used in a layer of a HV power cable operating at voltages of 40 kV or higher, even at voltages of 50 kV or higher. Further, the polymer composition may, for example, be used in a layer of a HV power cable operating at voltages of 60 kV or higher. The invention is suitable in very demanding cable applications and can be used in a layer of a HV power cable operating at voltages higher than 70 kV. The upper limit is not limited. The practical upper limit can be up to 900 kV. The invention is advantageous for use in HV power cable applications operating from 75 to 400 kV, for example 75 to 350 kV. The invention is also found to be advantageous even in demanding extra HV power cable applications operating 400 to 850 kV. The HV or extra HV power cable at any of the voltage ranges, as described herein, may, for example, be a HV DC power cable or an extra HV DC power cable.

HV DC power cable means herein either HV DC power cable, for example, with operating at voltages as defined herein, or extra high HV DC power cable, for example, with operating at voltages as defined herein. Thus the term covers independently the operating areas for both the HV DC cable also EHV DC cable applications.

In an embodiment of the present invention, a polymer composition, as described herein, is disclosed wherein the non-mineral oil is polyalkylene glycol (PAG).

The PAG may be homopolymer(s) of ethylene oxide, propylene oxide, butylene oxide, or octane oxide, or co-polymer(s) of ethylene oxide, propylene oxide, butylene oxide and/or octane oxide. In further embodiments the PAG may be homopolymer(s) of ethylene oxide, propylene oxide, butylene oxide, or octane oxide, or co-polymer(s) of ethylene oxide and/or propylene oxide.

The polymer composition has, for example, an electrical conductivity of 160 fS/m or less, e.g. 150 fS/m or less, for example, 140 fS/m or less, e.g. 130 fS/m or less, for example, 120 fS/m or less, e.g. 110 fS/m or less, for example, 100 fS/m or less, e.g. 90 fS/m or less, for example, 0.01 to 80 fS/m, when measured according to DC conductivity method using a 1 mm thick plaque sample as described under "Determination Methods". In embodiments with demanding needs for electrical properties, e.g. when operating at high voltages, it is suitable that the polymer composition has a conductivity even as low as 0.01 to 70 fS/m, for example, of 0.05 to 60 fS/m, e.g. 0.05 to 50 fS/m, for example, 0.05 to 40 fS/m, e.g. 0.05 to 30 fS/m, for example, 0.05 to 20.0 fS/m, e.g. 0.05 to 15.0 fS/m, for example, 0.05 to 10.0 fS/m, when measured according to DC conductivity method using a 1 mm thick plaque sample as described under "Determination Methods".

Accordingly, the invention is also directed to a method for reducing, i.e. for providing a low, electrical conductivity of a polymer composition of a power cable, for example, a DC power cable, by producing at least one layer, e.g. an insulation layer, using the polymer composition of the invention.

Further, the polymer composition comprises the polyolefin (a) in an amount of e.g. 0.1 to 99.9% by weight (wt %), for example, 0.5 wt % or, e.g. 0.5 to 80 wt %, for example, 1.0 to 70 wt %, e.g. 1.0 to 50 wt %, for example, 1.0 to 40 wt %, e.g. 1.0 to 30 wt %, for example, 1.0 to 25 wt %, e.g. 1.0 to 20 wt %, for example, 1.0 to 17 wt %, based on the combined weight of the polyolefin (a) and the polyolefin (b).

The polyolefin (a) is suitably a polyethylene polymerised in the presence of an olefin polymerisation catalyst and selected from an ethylene homopolymer or a copolymer of ethylene with one or more comonomer(s); or a homo- or copolymer of C3-20 alpha-olefin which is, for example, selected from a propylene homopolymer, a random copolymer of propylene with one or more comonomer(s) or heterophasic copolymer of propylene with one or more comonomer(s), or from homo- or copolymers of butene. "Polyethylene polymerised in the presence of an olefin polymerisation catalyst" is also often called as "low pressure polyethylene" to distinguish it clearly from LDPE. Both expressions are well known in the polyolefin field.

According to exemplified further embodiment, the polyolefin (a) is polyethylene selected from very low density polyethylene (VLDPE) copolymers, linear low density polyethylene (LLDPE) copolymers, medium density polyethylene (MDPE) copolymers or high density polyethylene (HDPE) homopolymers or copolymers. The low pressure polyethylene can be unimodal or multimodal with respect to molecular weight distribution.

According to still a further embodiment, the polyolefin (a) is a propylene homopolymer, a random copolymer of propylene with one or more comonomer(s) or heterophasic copolymer of propylene with one or more comonomer(s).

In a further embodiment, polyolefin (a) is a polyethylene polymerised in the presence of an olefin polymerisation catalyst and selected from an ethylene homopolymer or a copolymer of ethylene with one or more comonomer(s) as described herein. In even a further embodiment, the polyolefin (a) is a MDPE polymer or a HDPE polymer, for example, a HDPE polymer as described herein, e.g. a HDPE polymer which is unimodal or multimodal with respect to molecular weight distribution as described herein.

In still a further embodiment, the polymer composition comprises the polyolefin (b) in an amount of 0.1 to 99.9 wt %, for example, 99.5 wt % or less, e.g. 20 to 99.5 wt %, e.g. 30 to 99.0 wt %, for example, 50 to 99.0 wt %, e.g. 60 to 99.0 wt %, for example, 70 to 99.0 wt %, e.g. of 75 to 99.0 wt %, e.g. 80 to 99.0 wt %, for example, 83 to 99.0 wt %, based on the combined weight of the polyolefin (a) and the polyolefin (b).

Further, the polyolefin (b) may be a polyolefin as for polyolefin (a), as described herein, and is different from polyolefin (a), or is a low density polyethylene (LDPE) polymer selected from an optionally unsaturated LDPE homopolymer or an optionally unsaturated LDPE copolymer of ethylene with one or more comonomer(s). In an embodiment, the polyolefin (b) is an LDPE selected from an optionally unsaturated LDPE homopolymer or an optionally unsaturated LDPE copolymer of ethylene with one or more comonomer(s).

Further, the polymer composition of the invention is suitably crosslinkable.

"Crosslinkable" means that the polymer composition, which may, for example, be comprised in a cable layer, can be crosslinked using a crosslinking agent(s) before the use in the end application thereof. Crosslinkable polymer composition further comprises a crosslinking agent. It is suitable that the polyolefin (a) and the polyolefin (b) of the polymer composition are crosslinked. Moreover, the crosslinked polymer composition or, respectively, the crosslinked polyolefin (a) and the polyolefin (b), is, for example, crosslinked via radical reaction with a free radical generating agent. The crosslinked polymer composition has a typical network, i.a. interpolymer crosslinks (bridges), as well known in the field. As evident for a skilled person, the crosslinked polymer composition can be and is defined herein with features that are present in the polymer composition, polyolefin (a) or the polyolefin (b) before or after the crosslinking, as stated or evident from the context. For instance, the amount of the crosslinking agent in the polymer composition or a compositional property, such as MFR, density and/or unsaturation degree, of the polyolefin (a) or the polyolefin (b), are defined, unless otherwise stated, before crosslinking. "Crosslinked" means that the crosslinking step provides a further technical feature to the crosslinked polymer composition (product by process) which makes a further difference over prior art.

The polymer composition has the beneficial low electrical conductivity also when it is crosslinked.

In embodiments, wherein the polymer composition comprises no crosslinking agent, the electrical conductivity as described under the "Determination method" is measured from a sample of said polymer composition which is non-crosslinked (i.e. does not contain a crosslinking agent and has not been crosslinked with a crosslinking agent). In embodiments, wherein the polymer composition is crosslinkable and comprises a crosslinking agent, then the electrical conductivity is measured from a sample of the crosslinked polymer composition (i.e. a sample of the polymer composition is first crosslinked with the crosslinking agent initially present is the polymer composition and then the electrical conductivity is measured from the obtained crosslinked sample). The conductivity measurement from a non-crosslinked or a crosslinked polymer composition sample is described under "Determination Methods". The amount of the crosslinking agent, if present, can vary, within, for example, the ranges given herein.

The expression "no crosslinking agent" means herein that the polymer composition does not comprise any crosslinking agent which had been added to the polymer composition for the purpose of crosslinking the polymer composition.

Surprisingly, the polymer composition, wherein the crosslinked polymer composition comprises polyolefin (a) and polyolefin (b), and where polyolefin (b) is obtainable by a high pressure process which process comprise the use of a compressor lubricant comprising a non-mineral oil, has a reduced electrical conductivity compared to the electrical conductivity of a crosslinked polyolefin (b) alone.

The crosslinking contributes suitably also to the mechanical properties and the heat and deformation resistance of the polymer composition.

Accordingly, the polymer composition may further comprise crosslinking agent, for example, a peroxide. The polymer composition comprises, e.g. peroxide in an amount of up to 110 mmol —O—O-/kg polymer composition, for example, up to 90 mmol —O—O-/kg polymer composition, e.g. 0 to 75 mmol —O—O-/kg polymer composition, for example, less than 50 mmol —O—O-/kg polymer composition, e.g. less than 40 mmol —O—O-/kg polymer composition.

In a further embodiment the polymer composition comprises peroxide in an amount of less than 37 mmol —O—O-/kg polymer composition, for example, less than 35 mmol —O—O-/kg polymer composition, e.g. 0.1 to 34 mmol —O—O-/kg polymer composition, for example, 0.5 to 33 mmol —O—O-/kg polymer composition, e.g. 5.0 to 30 mmol —O—O-/kg polymer composition, for example, 7.0 to 30 mmol —O—O-/kg polymer composition, e.g. 10.0 to 30 mmol —O—O-/kg polymer composition.

The unit "mmol —O—O-/kg polymer composition" means herein the content (mmol) of peroxide functional groups per kg polymer composition, when measured from the polymer composition prior to crosslinking. For instance the 35 mmol —O—O-/kg polymer composition corresponds to 0.95 wt % of the, well known, dicumyl peroxide based on the total amount (100 wt %) of the polymer composition.

With low peroxide content advantageously low electrical conductivity can be achieved and the prior art drawbacks relating to the use of a crosslinking agent in a cable layer can be minimised. Moreover, the used lower peroxide content can shorten the required degassing step of the produced and crosslinked cable, if desired.

Such polymer composition may comprise one type of peroxide or two or more different types of peroxide, in which case the amount (in mmol) of —O—O-/kg polymer composition, as described herein, is the sum of the amount of —O—O-/kg polymer composition of each peroxide type. As non-limiting examples of suitable organic peroxides, di-tert-amylperoxide, 2,5-di(tert-butylperoxy)-2,5-dimethyl-3-hexyne, 2,5-di(tert-butylperoxy)-2,5-dimethylhexane, tert-butylcumylperoxide, di(tert-butyl)peroxide, dicumylperoxide, butyl-4,4-bis(tert-butylperoxy)-valerate, 1,1-bis(tert-butylperoxy)-3,3,5-trimethylcyclohexane, tert-butylperoxybenzoate, dibenzoylperoxide, bis(tert butylperoxyisopropyl)benzene, 2,5-dimethyl-2,5-di(benzoylperoxy) hexane, 1,1-di(tert-butylperoxy)cyclohexane, 1,1-di(tert amylperoxy)cyclohexane, or any mixtures thereof, can be mentioned. The peroxides may be selected from 2,5-di(tert-butylperoxy)-2,5-dimethylhexane, di(tert-butylperoxyisopropyl)benzene, dicumylperoxide, tert-butylcumylperoxide, di(tert-butyl)peroxide, or mixtures thereof. Further, the peroxide may, e.g. be dicumylperoxide.

Additionally, the polymer composition of the invention may contain, in addition to the polyolefin (a), polyolefin (b) and the optional peroxide, further component(s) such as polymer component(s) and/or additive(s), for example, additive(s), such as any of antioxidant(s), scorch retarder(s) (SR), crosslinking booster(s), stabiliser(s), processing aid(s), flame retardant additive(s), water tree retardant additive(s), acid or ion scavenger(s), inorganic filler(s) and voltage stabilizer(s), as known in the polymer field. The polymer composition comprises, for example, conventionally used additive(s) for W&C applications, such as one or more antioxidant(s) and optionally one or more of scorch retarder(s) or crosslinking booster(s), e.g. at least one or more antioxidant(s). The used amounts of additives are conventional and well known to a skilled person.

As non-limiting examples of antioxidants e.g. sterically hindered or semi-hindered phenols, aromatic amines, aliphatic sterically hindered amines, organic phosphites or phosphonites, thio compounds, and mixtures thereof, can be mentioned.

The combined amount of polyolefin (a) and the polyolefin (b) in the polymer composition of the invention is typically of at least 50 wt %, for example, 80 to 100 wt % and, for example, 85 to 100 wt %, of the total weight of the polymer component(s) present in the polymer composition. An exemplified polymer composition consists of polyolefin (a) and the polyolefin (b) as the only polymer components. The expression means that the polymer composition does not contain further polymer components, but the polyolefin (a) and the polyolefin (b) as the sole polymer component(s). However, it is to be understood herein that the polymer composition may comprise further components other than the polyolefin (a) and the polyolefin (b) components, such as additives which may optionally be added in a mixture with a carrier polymer, i.e. in so called master batch.

The polymer composition, for example, one or both of the polyolefin (a) and the polyolefin (b), or, e.g., the polyolefin (b), may optionally be unsaturated (contain carbon-carbon double bonds) before the optional crosslinking, as further described herein under the polyolefin (b).

The invention also provides independently a subgroup of the polymer composition which comprises
a polyolefin (a) which is other than low density polyethylene (LDPE), and which is selected from a polyethylene produced in the presence of a olefin polymerisation catalyst or a polypropylene, for example, a MDPE polymer or a HDPE polymer, e.g. a HDPE polymer,
a polyolefin (b) which is different from the polyolefin (a), for example, an LDPE polymer, e.g. an optionally unsaturated LDPE homopolymer or an optionally unsaturated LDPE copolymer of ethylene with one or more comonomer(s), and a peroxide in an amount of less than 37 mmol —O—O-/kg polymer composition, for example, less than 35 mmol —O—O-/kg polymer composition, e.g. of 0.1 to 34 mmol —O—O-/kg polymer composition, for example, 0.5 to 33 mmol —O—O-/kg polymer composition, e.g. 5.0 to 30 mmol —O—O-/kg polymer composition, for example, 7.0 to 30 mmol —O—O-/kg polymer composition, e.g. 10.0 to 30 mmol —O—O-/kg polymer composition. This subgroup is, for example, crosslinkable and, when crosslinked, provides highly reduced electrical conductivity. The subgroup of polymer composition is novel.

In this subgroup of the polymer composition the amount of the polyolefin (a) is, for example, 50 wt % or less, e.g. 1.0 to 40 wt %, for example, 1.0 to 30 wt %, e.g. 1.0 to 25 wt %, for example, 1.0 to 20 wt %, based on the combined weight of the polyolefin (a) and the polyolefin (b). For example, in this subgroup, the amount of the polyolefin (b) is 50 wt % or, e.g. 60 to 99.0 wt %, for example, 70 to 99.0 wt %, e.g. 75 to 99.0 wt %, for example, 80 to 99.0 wt %, based on the combined weight of the polyolefin (a) and the polyolefin (b).

This independent subgroup of the polymer composition of the invention is also an exemplified subgroup of the polymer composition of the invention present in at least one layer, for example, at least in the insulation layer, of the power cable of the invention as described herein.

For example, the polymer composition of the invention and the subgroup thereof as described herein may be used for producing an insulation layer. Further, the polymer composition may suitably be void of, i.e. does not comprise, a carbon black. Further, the polymer composition is avoid of, does not comprise, flame retarding additive(s) in such amounts conventionally used for acting as "flame retardants", e.g. a metal hydroxide containing additives in flame retarding amounts.

The embodiments, properties and subgroups of the polyolefin (a) and the polyolefin (b) components for the polymer composition as described herein may independently be generalisable so that they can be used in any order or combination to further define exemplified embodiments of the polymer composition and the cable produced using the polymer composition. Moreover, it is evident that the given polyolefin (a) and (b) descriptions apply to the polyolefin prior optional crosslinking.

Polyolefin (a)

The polyolefin (a) may be a low pressure polyethylene, i.e. polyethylene polymerised in the presence of an olefin polymerisation catalyst; or a homo- or copolymer of C3-20 alpha-olefin which is, for example, a polypropylene or a homo- or copolymers of butene. The polyolefin (a) is, for example, a low pressure polyethylene or polypropylene.

"Olefin polymerisation catalyst" means herein a conventional coordination catalyst. It is, for example, selected from a Ziegler-Natta catalyst, single site catalyst which term comprises a metallocene and a non-metallocene catalyst, or a chromium catalyst, or any mixture thereof.

The term "polyethylene" (PE) means homopolymer of ethylene or a copolymer of ethylene with one or more comonomer(s). "Polypropylene" (PP) means propylene homopolymer, a random copolymer of propylene with one or more comonomer(s) or heterophasic copolymer of propylene with one or more comonomer(s).

Low pressure PE or PP can be unimodal or multimodal with respect to molecular weight distribution (MWD=Mw/Mn). Generally, a polymer comprising at least two polymer fractions, which have been produced under different polymerization conditions resulting in different (weight average) molecular weights and molecular weight distributions for the fractions, is referred to as "multimodal". The prefix "multi" relates to the number of different polymer fractions present in the polymer. Thus, for example, multimodal polymer includes so called "bimodal" polymer consisting of two fractions. The form of the molecular weight distribution curve, i.e. the appearance of the graph of the polymer weight fraction as a function of its molecular weight, of a multimodal polymer will show two or more maxima or is typically distinctly broadened in comparison with the curves for the individual fractions. For example, if a polymer is produced in a sequential multistage process, utilizing reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions form typically together a broadened molecular weight distribution curve for the total resulting polymer product.

The term "multimodal" means herein, unless otherwise stated, multimodality at least with respect to molecular weight distribution (MWD=Mw/Mn) and includes also bimodal polymer.

A multimodal low pressure PE or PP usable in the present invention comprises a lower weight average molecular weight (LMW) component (A) and a higher weight average molecular weight (HMW) component (B). Said LMW component has a lower molecular weight than the HMW component.

Naturally, the multimodal low pressure PE or PP may in addition or alternatively to multimodality with respect to MWD be multimodal with respect to density and comonomer content. I.e. the LMW and HMW components may have different comonomer content or density, or both.

Further, the low pressure PE and PP independently have a MWD of at least 2.0, for example, at least 2.5, e.g. at least 2.9, for example, 3 to 30, e.g. 3.3 to 25, for example, 3.5 to 20, e.g. 3.5 to 15. An unimodal PE or PP has typically a MWD of 3.0 to 10.0.

The low pressure PE or PP can be a copolymer of ethylene or, respectively, of propylene (random or heterophasic), with one or more comonomer(s). Comonomer as used herein means monomer units other than ethylene or, respectively propylene, which are copolymerisable with ethylene or, respectively with propylene.

The low pressure PE copolymer is, for example, a copolymer of ethylene with one or more olefin comonomer(s), e.g. with at least C3-20 alpha olefin, for example, with at least one C4-12 alpha-olefin, e.g. with at least one C4-8 alpha-olefin, e.g. with 1-butene, 1-hexene or 1-octene. The amount of comonomer(s) present in a PE copolymer is from 0.1 to 15 mol %, typically 0.25 to 10 mol %.

The PP copolymer is, for example, a copolymer of propylene with one or more olefin comonomer(s), e.g. with at least one of ethylene or C4-20 alpha olefin, for example, with at least one of ethylene or C4-12 alpha-olefin, e.g. with at least one of ethylene or C4-8 alpha-olefin, e.g. with ethylene, 1-butene, 1-hexene or 1-octene.

Further, the low pressure PE or PP copolymer can be a binary copolymer, i.e. the polymer contains ethylene and one comonomer, or a terpolymer, i.e. the polymer contains ethylene and two or three comonomers.

In one further embodiment the polyolefin (a) is a low pressure PE selected from a very low density ethylene copolymer (VLDPE), a linear low density ethylene copolymer (LLDPE), a medium density ethylene copolymer (MDPE) or a high density ethylene homopolymer or copolymer (HDPE). These well known types are named according to their density area. The term VLDPE includes herein PEs which are also known as plastomers and elastomers and covers the density range of from 850 to 909 kg/m$^3$. The LLDPE has a density of from 909 to 930 kg/m$^3$, for example, 910 to 929 kg/m$^3$, e.g. 915 to 929 kg/m$^3$. The MDPE has a density of from 930 to 945 kg/m$^3$, for example, 931 to 945 kg/m$^3$. The HDPE has a density of more than 945 kg/m$^3$, e.g. more than 946 kg/m$^3$, for example, 946 to 977 kg/m$^3$, e.g. 946 to 965 kg/m$^3$.

MDPE or HDPE are exemplified types of low pressure PE for use as the polyolefin (a) of the present invention. The polyolefin (a) is, for example, HDPE homopolymer or copolymer, e.g. HDPE homopolymer. Such HDPE can unimodal or multimodal.

The low pressure PE has, for example, an MFR$_2$ of up to 1200 g/10 min, such as of up to 1000 g/10 min, e.g. up to 500 g/10 min, for example, up to 400 g/10 min, e.g. up to 300 g/10 min, for example, up to 200 g/10 min, e.g. up to 150 g/10 min, for example, 0.01 to 100, e.g. 0.01 to 50 g/10 min, for example, 0.01 to 40.0 g/10 min, e.g. 0.05 to 30.0 g/10 min, for example, 0.1 to 20.0 g/10 min, e.g. 0.2 to 15.0 g/10 min.

In another embodiment the polyolefin (a) is a propylene homopolymer, a random copolymer of propylene with one or more comonomer(s) or heterophasic copolymer of propylene with one or more comonomer(s). The types of polypropylenes are well known in the field.

In "random copolymer" the comonomer(s) in said copolymer is distributed randomly, i.e. by statistical insertion of the comonomer units, within the copolymer chain. Said "heterophasic copolymer of propylene" comprises a matrix phase which can be a propylene homopolymer or a propylene copolymer, and an elastomeric phase of propylene copolymer, also known as rubber part, which is dispersed in said matrix phase.

A propylene homopolymer as the polyolefin (a) has typically a xylene soluble content (XS, in wt %) e.g. of below 5 wt %, such as 0.1 to 3 wt %, based on the amount of said propylene homopolymer.

A random propylene copolymer as the polyolefin (a) contains, for example, conventionally used amounts of comonomer, for example up to 30 wt % of the amount of said random propylene copolymer, e.g. between 0.5 to 20 wt %, for example, 1.0 to 10 wt %, e.g. 2.0 to 7 wt % based on the amount of said random propylene copolymer. The xylene solubles content (wt %) of said random propylene copolymer is, for example, up to 20 wt %, e.g. up to 15 wt %, e.g. 0.5 to 10 wt %, based on the amount of said random propylene copolymer. A heterophasic propylene copolymer as the polyolefin (a) comprises the matrix phase of propylene homo- or copolymer of up to 95 wt %, for example, 20 to 90 wt %, the elastomeric propylene copolymer phase of up to 80 wt %, e.g. 10 to 40 wt %, based on the amount of said heterophasic propylene copolymer. In case said matrix phase of said heterophasic propylene copolymer is a random propylene copolymer, then the comonomer content and XS (wt %) content of said matrix phase is, for example, as described herein for said random copolymer as said polyolefin (a). In case said matrix phase is a propylene homopolymer, then said XS (wt %) content is, e.g., as described herein for said propylene homopolymer component as said polyolefin (a). The heterophasic propylene copolymer has typically a total xylene solubles (wt %) of up to 50 wt %, for example, up to 30 wt %, based on the amount of the heterophasic propylene copolymer.

PP as the polyolefin (a) has e.g. an MFR$_2$ of up to 1200 g/10 min, such as of up to 1000 g/10 min, for example, up to 500 g/10 min, e.g. up to 400 g/10 min, for example, up to 300 g/10 min, e.g. up to 200 g/10 min, for example, up to 150 g/10 min, e.g. 0.01 to 100, for example, 0.01 to 50 g/10 min, e.g. 0.01 to 40.0 g/10 min, for example, 0.05 to 30.0 g/10 min, e.g. 0.1 to 20.0 g/10 min, for example, 0.2 to 15.0 g/10 min.

An exemplified polyolefin (a) may be a polyethylene polymerised in the presence of an olefin polymerisation catalyst and selected from an ethylene homopolymer or a copolymer of ethylene with one or more comonomer(s) as described herein, including the herein exemplified subgroups thereof.

Suitable low pressure PE and PP as the polyolefin (a) are as such well known and can be e.g. commercially available or, alternatively, can be produced according to or analogously to conventional polymerisation processes which are well documented in the literature.

The catalyst can be selected from well known coordination catalysts, for example, from Ziegler Natta, single site, which term comprises well known metallocene and non-metallocene catalyst, or Chromium catalyst, or any mixtures thereof. It is evident for a skilled person that the catalyst system comprises a co-catalyst. Suitable Ziegler Natta catalysts for low pressure PE are described e.g. in EP0810235 or EP0688794 which are all incorporated by reference herein. Suitable Ziegler Natta catalysts for PP are described e.g. in WO03000754 or EP 1 484 345, which are all incorporated by reference herein. As known PP catalysts typically may contain internal or external donors. As well known the catalytically active catalyst component(s), such as the catalytically active component of the Ziegler Natta catalyst, is normally combined with an activator. Moreover the catalyst system can be non-supported or supported on a carrier, such as external carrier, like silica-based or Mg-based carrier.

The unimodal low pressure PE and PP can be produced by a single stage polymerisation in a single reactor in a well known and documented manner. The multimodal (e.g. bimodal) low pressure PE or PP can be produced e.g. by blending mechanically together two or more separate polymer components or, for example, by in-situ blending during the polymerisation process of the components. Both mechanical and in-situ blending are well known in the field. Accordingly, the exemplified in-situ blending means the polymerisation of the polymer components under different polymerisation conditions, e.g. in a multistage, i.e. two or more stage, polymerization or by the use of two or more different polymerization catalysts, including multi- or dual site catalysts, in a one stage polymerization, or by use of a combination of multistage polymerisation and two or more different polymerisation catalysts. In the multistage polymerisation process the polymer is polymerised in a process comprising at least two polymerisation stages. Each polymerisation stage may be conducted in at least two distinct polymerisation zones in one reactor or in at least two separate reactors. Further, the multistage polymerisation process is conducted in at least two cascaded polymerisation zones. Polymerisation zones may be connected in parallel, or, for example, the polymerisation zones operate in cascaded mode. The polymerisation zones may operate in bulk, slurry, solution, or gas phase conditions or in any combinations thereof. In the exemplified multistage process a first polymerisation step is carried out in at least one slurry, e.g. loop, reactor and the second polymerisation step in one or more gas phase reactors. One exemplified multistage process is described in EP517868. For suitable polypropylenes as said polyolefin (a) the preparation processes thereof, reference is also made to e.g. Nello Pasquini (Ed.) Polypropylene Handbook, Hanser, Munich, 2005, pages 15-141.

In general, the temperature in the low pressure PE and PP polymerisation is typically from 50 to 115° C., for example, 60 to 110° C. The pressure is from 1 to 150 bar, for example, 10 to 100 bar. The precise control of polymerisation conditions can be performed using different types of catalyst and using different comonomer and/or hydrogen feeds.

Prepolymerisation may precede the actual polymerisation step(s), as well known in the field.

In case of heterophasic copolymer of propylene the matrix of propylene homopolymer or random copolymer can be produced e.g. in a single stage or as a multistage process described herein and the elastomeric (rubber) part of the propylene copolymer can be produced as an in-situ polymerisation e.g. in a separate reactor, e.g. gas phase reactor in the presence of the matrix polymer produced in the previous stage. Alternatively the elastomeric copolymer of propylene part can be mechanically compounded to the matrix phase material, as well known in the art.

The obtained low pressure PE or PP polymerisation product may be compounded in a known manner and optionally with additive(s) and pelletised for further use.

Polyolefin (b)

The polyolefin (b) is a low density polyethylene (LDPE) polymer which is obtainable by a high pressure process which process comprise the use of a compressor lubricant comprising a non-mineral oil.

A suitable polyolefin as the polyolefin (b) can be any LDPE, such as any conventional LDPE, which can be used in a cable layer, for example, in an insulating layer, of a cable, e.g. a power cable.

Suitable LDPEs as the polyolefin (b) are e.g. as such well known and can be e.g. commercially available or can be prepared according to or analogously to known polymerization processes described in the chemical literature.

The polyolefin (b) may, for example, be an LDPE polymer which may be a low density homopolymer of ethylene (referred herein as LDPE homopolymer) or a low density copolymer of ethylene with one or more comonomer(s) (referred herein as LDPE copolymer). The one or more comonomers of LDPE copolymer may, for example, be selected from the polar comonomer(s), non-polar comonomer(s) or from a mixture of the polar comonomer(s) and non-polar comonomer(s), as described herein. Moreover, said LDPE homopolymer or LDPE copolymer as said polyolefin (b) may optionally be unsaturated.

As well known "comonomer" refers to copolymerisable comonomer units.

As a polar comonomer for the LDPE copolymer as said polyolefin (b), comonomer(s) containing hydroxyl group(s), alkoxy group(s), carbonyl group(s), carboxyl group(s), ether group(s) or ester group(s), or a mixture thereof, can be used. Further, comonomer(s) containing carboxyl and/or ester group(s) may, for example, be used as said polar comonomer. Furthermore, the polar comonomer(s) of LDPE copolymer is selected from the groups of acrylate(s), methacrylate(s) or acetate(s), or any mixtures thereof. If present in said LDPE copolymer, the polar comonomer(s) is, for example, selected from the group of alkyl acrylates, alkyl methacrylates or vinyl acetate, or a mixture thereof. Further, said polar comonomers may, for example, be selected from $C_1$- to $C_6$-alkyl acrylates, $C_1$- to $C_6$-alkyl methacrylates or vinyl acetate. Furthermore, said polar LDPE copolymer may, for example, be a copolymer of ethylene with $C_1$- to $C_4$-alkyl acrylate, such as methyl, ethyl, propyl or butyl acrylate, or vinyl acetate, or any mixture thereof.

As the non-polar comonomer(s) for the LDPE copolymer as said polyolefin (b), comonomer(s) other than the herein described polar comonomers can be used. Further, the non-polar comonomers may, for example, be other than comonomer(s) containing hydroxyl group(s), alkoxy group(s), carbonyl group(s), carboxyl group(s), ether group(s) or ester group(s). One group of exemplified non-polar comonomer(s) comprise, e.g. consist of, monounsaturated (=one double bond) comonomer(s), for example, olefins, e.g. alpha-olefins, for example, $C_3$ to $C_{10}$ alpha-olefins, such as propylene, 1-butene, 1-hexene, 4-methyl-1-pentene, styrene, 1-octene, 1-nonene; polyunsaturated (=more than one double bond) comonomer(s); a silane group containing comonomer(s); or any mixtures thereof. The polyunsaturated comonomer(s) are further described herein in relation to unsaturated LDPE copolymers.

If the LDPE polymer is a copolymer, it may, for example comprise 0.001 to 50 wt.-%, e.g. 0.05 to 40 wt.-%, for example, less than 35 wt.-%, e.g. less than 30 wt.-%, for example, less than 25 wt.-%, of one or more comonomer(s).

The polymer composition, for example, at least the polyolefin (b) component thereof, the LDPE polymer, may optionally be unsaturated, i.e. the polymer composition, for example, at least the polyolefin (b), e.g. the LDPE polymer, may comprise carbon-carbon double bonds (—C═C—). The "unsaturated" means herein that the polymer composition, for example, the polyolefin (b), contains carbon-carbon double bonds/1000 carbon atoms in a total amount of at least 0.1; at least 0.2; at least 0.3 or alternatively, at least 0.4/1000 carbon atoms.

As well known, the unsaturation can be provided to the polymer composition i.a. by means of the polyolefin (s), a low molecular weight (Mw) compound(s), such as crosslinking booster(s) or scorch retarder additive(s), or any combinations thereof. The total amount of double bonds means herein double bonds determined from the source(s) that are known and deliberately added to contribute to the unsaturation. If two or more above sources of double bonds are chosen to be used for providing the unsaturation, then the total amount of double bonds in the polymer composition means the sum of the double bonds present in the double-bond sources. It is evident that a characteristic model compound for calibration is used for each chosen source to enable the quantitative infrared (FTIR) determination.

Any double bond measurements are carried out prior to optional crosslinking.

If the polymer composition is unsaturated (prior to optional crosslinking), then the unsaturation may, for example, originate at least from an unsaturated polyolefin (b) component. Further, the unsaturated polyolefin (b) is an unsaturated polyethylene, e.g. an unsaturated LDPE polymer, for example, an unsaturated LDPE homopolymer or an unsaturated LDPE copolymer. When polyunsaturated comonomer(s) are present in the LDPE polymer as said unsaturated polyolefin, then the LDPE polymer is an unsaturated LDPE copolymer.

In a further embodiment the term "total amount of carbon-carbon double bonds" is defined from the unsaturated polyolefin (b), and refers, if not otherwise specified, to the combined amount of double bonds which originate from vinyl groups, vinylidene groups and trans-vinylene groups, if present. Naturally the polyolefin (b) does not necessarily contain all the three types of double bonds as described herein. However, any of the three types, when present, is calculated to the "total amount of carbon-carbon double bonds". The amount of each type of double bond is measured as indicated under "Determination methods".

If an LDPE homopolymer is unsaturated, then the unsaturation can be provided e.g. by a chain transfer agent (CTA), such as propylene, and/or by polymerization conditions. If an LDPE copolymer is unsaturated, then the unsaturation can be provided by one or more of the following means: by a chain transfer agent (CTA), by one or more polyunsaturated comonomer(s) or by polymerisation conditions. It is well known that selected polymerisation conditions such as peak temperatures and pressure, can have an influence on the unsaturation level. In case of an unsaturated LDPE copolymer, it is, for example, an unsaturated LDPE copolymer of ethylene with at least one polyunsaturated comonomer, and optionally with other comonomer(s), such as polar comonomer(s) which may, for example, then be selected from acrylate or acetate comonomer(s). For example, an unsaturated LDPE copolymer may be an unsaturated LDPE copolymer of ethylene with at least polyunsaturated comonomer(s).

The polyunsaturated comonomers suitable for the unsaturated polyolefin (b), for example, consist of a straight carbon chain with at least 8 carbon atoms and at least 4 carbons between the non-conjugated double bonds, of which at least one is terminal, e.g. said polyunsaturated comonomer is a diene, for example, a diene which comprises at least eight carbon atoms, the first carbon-carbon double bond being terminal and the second carbon-carbon double bond being non-conjugated to the first one. Exemplified dienes are selected from $C_8$ to $C_{14}$ non-conjugated dienes or mixtures thereof, for example, selected from 1,7-octadiene, 1,9-decadiene, 1,11-dodecadiene, 1,13-tetradecadiene, 7-methyl-1,6-octadiene, 9-methyl-1,8-decadiene, or mixtures thereof. Further, the diene is, for example, selected from 1,7-octadiene, 1,9-decadiene, 1,11-dodecadiene, 1,13-tetradecadiene, or any mixture thereof, however, without limiting to dienes described herein.

It is well known that e.g. propylene can be used as a comonomer or as a chain transfer agent (CTA), or both, whereby it can contribute to the total amount of the carbon-carbon double bonds, for example, to the total amount of the vinyl groups. Herein, when a compound which can also act as comonomer, such as propylene, is used as CTA for providing double bonds, then said copolymerisable comonomer is not calculated to the comonomer content.

If the polyolefin (b), i.e. the LDPE polymer, is unsaturated, then it has, e.g. a total amount of carbon-carbon double bonds, which originate from vinyl groups, vinylidene groups and trans-vinylene groups, if present, of more than 0.1; more than 0.2; more than 0.3; more than 0.4 or, alternatively, more than 0.5/1000 carbon atoms. The upper limit of the amount of carbon-carbon double bonds present in the polyolefin (b) is not limited and may, for example, be less than 5.0/1000 carbon atoms, e.g., less than 3.0/1000 carbon atoms.

In some embodiments, e.g. wherein higher crosslinking level with the low peroxide content is desired, the total amount of carbon-carbon double bonds, which originate from vinyl groups, vinylidene groups and trans-vinylene groups, if present, in the unsaturated LDPE, is, for example, higher than 0.40/1000 carbon atoms, e.g. higher than 0.50/1000 carbon atoms, for example, higher than 0.60/1000 carbon atoms.

Further, the polyolefin is, for example, unsaturated and contains at least vinyl groups and the total amount of vinyl groups is, for example, higher than 0.01/1000 carbon atoms, e.g., higher than 0.05/1000 carbon atoms, for example, higher than 0.08/1000 carbon atoms, and, e.g., higher than 0.11/1000 carbon atoms. Furthermore, the total amount of vinyl groups is, for example, lower than 4.0/1000 carbon atoms. The polyolefin, prior to crosslinking, contains vinyl groups in total amount of, for example, more than 0.20/1000 carbon atoms, e.g., more than 0.30/1000 carbon atoms, and, for example, more than 0.40/1000 carbon atoms. In some demanding embodiments, for example, in power cables, e.g., in DC power cables, at least one layer, for example an insulation layer, comprises LDPE polymer, e.g., LDPE copolymer, which contains vinyl groups in total amount of more than 0.50/1000 carbon atoms.

In an exemplified embodiment, the polyolefin (b) is unsaturated LDPE polymer as described herein and the polymer composition contains the exemplified "low" peroxide content of the invention as described herein. Higher double bond content combined with the exemplified "low" peroxide content further contributes to the low electrical conductivity. An embodiment is also e.g. if high cable production speed or longer extrusion time, or both, is desired. The embodiment also contributes to the desirable mechanical and/or heat resistance properties are needed for the layer, for example, insulation layer, material.

Further, the polyolefin (b) is unsaturated LDPE as described herein and contains at least vinyl groups and the total amount of vinyl groups is, for example, higher than 0.05/1000 carbon atoms, e.g. higher than 0.08/1000 carbon atoms, and, for example, higher than 0.11/1000 carbon atoms. Further, the total amount of vinyl groups is of lower than 4.0/1000 carbon atoms. Furthermore, the polyolefin (b), prior to crosslinking, contains vinyl groups in total amount of more than 0.20/1000 carbon atoms, e.g. more than 0.30/1000 carbon atoms.

The exemplified polyolefin (b) for use in the polymer composition is an unsaturated LDPE copolymer of ethylene with at least one polyunsaturated comonomer, for example, a diene as described herein, and optionally with other comonomer(s), and has the total amount of carbon-carbon double bonds, which originate from vinyl groups, vinylidene groups and trans-vinylene groups, if present, as described herein, e.g. has the total amount of vinyl groups as described herein. Said unsaturated LDPE copolymer is highly usable for the invention for use as the polyolefin (b) of a polymer composition, for example, in an insulation layer of a power cable, e.g. of a DC power cable.

Typically, in wire and cable (W&C) applications, the density of the polyolefin (b), for example, of the LDPE polymer, is higher than 860 kg/m$^3$. The density of the polyolefin (b), for example, of the LDPE homopolymer or copolymer, is, for example, not higher than 960 kg/m$^3$, and is e.g. from 900 to 945 kg/m$^3$. The MFR$_2$ (2.16 kg, 190° C.) of the polyolefin (b), for example, of the LDPE polymer, is e.g. 0.01 to 50 g/10 min, for example, 0.01 to 40.0 g/10, e.g. is from 0.1 to 20 g/10 min, and is, for example, 0.2 to 10 g/10 min Accordingly, the polyolefin (b) of the invention is a LDPE polymer, which is produced by high pressure polymerisation, suitably by free radical initiated polymerisation (referred to as high pressure (HP) radical polymerisation), comprising a compressor lubricant which comprises a non-mineral oil.

The HP reactor can be e.g. a well known tubular or autoclave reactor or a mixture thereof, for example, a tubular reactor. The high pressure (HP) polymerisation and the adjustment of process conditions for further tailoring the other properties of the polyolefin depending on the desired end application are well known and described in the literature, and can readily be used by a skilled person. Suitable polymerisation temperatures range up to 400° C., for example, 80 to 350° C. and pressure from 70 MPa, e.g. 100 to 400 MPa, for example, 100 to 350 MPa. Pressure can be measured at least after compression stage and/or after the tubular reactor. Temperature can be measured at several points during all steps.

Compressor Lubricant

The compressor lubricant used in the polymerization process for producing the polyolefin of the polymer composition comprises a non-mineral oil.

In an embodiment of the present invention, a polymer composition, as described herein, is disclosed wherein the non-mineral oil is polyalkylene glycol (PAG).

In further embodiments of the present invention, the PAG may be homopolymer(s) of ethylene oxide, propylene oxide, butylene oxide, or octane oxide, or co-polymer(s) of ethylene oxide, propylene oxide, butylene oxide and/or octane oxide. In still further embodiments the PAG may be homopolymer(s) of ethylene oxide, propylene oxide, butylene oxide, or octane oxide, or co-polymer(s) of ethylene oxide and/or propylene oxide.

The non-mineral oil may, for example, be comprised in the polyolefin (b) in an amount of 10 to 250 ppm or, alternatively, 20 to 200 ppm.

The compressor lubricant may comprise other components, such as lubricity additive(s), viscosity builders, antioxidants, other additive(s) or any mixtures thereof, as well known in the art.

Process

The high pressure (HP) process is a suitable process for producing the polyolefin (b) of the polymer composition, for example, a low density polyethylene (LDPE) polymer selected from LDPE homopolymer or LDPE copolymer of ethylene with one or more comonomers. The invention further provides a process for polymerising the polyolefin (b) in a high pressure process which comprises the steps of: compressing one or more monomer(s) under pressure in a compressor, wherein a compressor lubricant is used for lubrication, polymerising a monomer optionally together with one or more comonomer(s) in a polymerisation zone(s), separating the obtained polyolefin from the unreacted products and recovering the separated the polyolefin (b) in a recovery zone, wherein the compressor lubricant comprises a non-mineral oil including the embodiments thereof.

Accordingly, the polyolefin (b) of the present invention is, for example, produced at high pressure by free radical initiated polymerisation (referred to as high pressure radical polymerization). Further, the polyolefin is, for example, LDPE homopolymer or LDPE copolymer of ethylene with one or more comonomer(s), as described herein. The LDPE polymer obtainable by the process of the invention provides, e.g. the advantageous electrical properties as described herein. The high pressure (HP) polymerisation and the adjustment of process conditions for further tailoring the other properties of the polyolefin depending on the desired end application are well known and described in the literature, and can readily be used by a skilled person.

Compression Step of the Process of the Invention:

Monomer, for example, ethylene, with one or more optional comonomer(s), is fed to one or more compressor at compressor zone to compress the monomer(s) up to the desired polymerization pressure and to enable handling of high amounts of monomer(s) at controlled temperature. Typical compressors, i.e. hyper-compressors, for the process can be piston compressors or diaphragm compressors. The compressor zone usually comprises one or more compressor(s), i.e. hyper-compressor(s), which can work in series or in parallel. The compressor lubricant, being a non-mineral oil in accordance with the present invention, is used for cylinder lubrication in at least one, for example, in all of the hyper-compressor(s), present in the compressor zone. The compression step comprises usually 2-7 compression steps, often with intermediate cooling zones. Temperature is typically low, usually in the range of less than 200° C., for example, less than 100° C. Any recycled monomer, e.g. ethylene, and optional comonomer(s) can be added at feasible points depending on the pressure.

Polymerisation Step of the Process:

The exemplified high pressure polymerisation is effected at a polymerisation zone which comprises one or more polymerisation reactor(s), e.g. at least a tubular reactor or an autoclave reactor, for example, a tubular reactor. The polymerization reactor(s), e.g. a tubular reactor, may comprise one or more reactor zones, wherein different polymerization conditions may occur and/or adjusted as well known in the HP field. One or more reactor zone(s) are provided in a known manner with means for feeding monomer and optional comonomer(s), as well as with means for adding initiator(s) and/or further components, such as CTA(s).

Additionally, the polymerization zone may comprise a preheating section which is preceding or integrated to the polymerization reactor. In one exemplified HP process the monomer, for example, ethylene, optionally together with one or more comonomer(s) is polymerized in an exemplified tubular reactor, e.g. in the presence of chain transfer agent(s).

Tubular Reactor:

The reaction mixture is fed to the tubular reactor. The tubular reactor may be operated as a single-feed system (also known as front feed), wherein the total monomer flow from the compressor zone is fed to the inlet of the first reaction zone of the reactor. Alternatively the tubular reactor may be a multifeed system, wherein e.g the monomer(s), the optional comonomer(s) or further component(s) (like CTA(s)) coming from the compression zone, separately or in any combinations, is/are split to two or more streams and the split feed(s) is introduced to the tubular reactor to the different reaction zones along the reactor. For instance 10-90% of the total monomer quantity is fed to the first reaction zone and the other 90-10% of the remaining monomer quantity is optionally further split and each split is injected at different locations along the reactor. Also the feed of initiator(s) may be split in two or more streams. Moreover, in a multifeed system the split streams of monomer(/comonomer) and/or optional further component(s), such as CTA, and, respectively, the split streams of initiator(s) may have the same or different component(s) or concentrations of the components, or both.

The single feed system for the monomer and optional comonomer(s) is exemplified in the tubular reactor for producing the polyolefin of the invention.

First part of the tubular reactor is to adjust the temperature of the feed of monomer, for example, ethylene, and the optional comonomer(s); usual temperature is below 200° C., such as 100-200° C. Then the radical initiator is added. As the radical initiator, any compound or a mixture thereof that decomposes to radicals at an elevated temperature can be used. Usable radical initiators, such as peroxides, are commercially available. The polymerization reaction is exothermic. There can be several radical initiator injections points, e.g. 1-5 points, along the reactor usually provided with separate injection pumps. As already mentioned also the monomer, for example, ethylene, and optional comonomer(s), is added at front and optionally the monomer feed(s) can be split for the addition of the monomer and/or optional comonomer(s), at any time of the process, at any zone of the tubular reactor and from one or more injection point(s), e.g. 1-5 point(s), with or without separate compressors.

Furthermore, one or more CTA(s) are, for example, used in the polymerization process of the Polyolefin. Exemplified CTA(s) can be selected from one or more non-polar and one or more polar CTA(s), or any mixtures thereof.

Non-polar CTA, if present, is, for example, selected from i) one or more compound(s) which does not contain a polar group selected from nitrile (CN), sulfide, hydroxyl, alkoxy, aldehyl (HC=O), carbonyl, carboxyl, ether or ester group(s), or mixtures thereof. Non-polar CTA is, for example, selected from one or more non-aromatic, straight chain branched or cyclic hydrocarbyl(s), optionally containing a hetero atom such as O, N, S, Si or P. Further, the non-polar CTA(s) is, for example, selected from one or more cyclic alpha-olefin(s) of 5 to 12 carbon or one or more straight or branched chain alpha-olefin(s) of 3 to 12 carbon atoms, e.g. from one or more straight or branched chain alpha-olefin(s) of 3 to 6 carbon atoms. An exemplified non-polar CTA is propylene.

The polar CTA, if present, is, for example, selected from i) one or more compound(s) comprising one or more polar group(s) selected from nitrile (CN), sulfide, hydroxyl, alkoxy, aldehyl (HC=O), carbonyl, carboxyl, ether or ester group(s), or mixtures thereof;
ii) one or more aromatic organic compound(s), or
iii) any mixture thereof.

For example, any such polar CTA(s) have up to 12 carbon atoms, e.g. up to 10 carbon atoms e.g. up to 8 carbon atoms. An exemplified option includes a straight chain or branched chain alkane(s) having up to 12 carbon atoms (e.g. up to 8 carbon atoms) and having at least one nitrile (CN), sulfide, hydroxyl, alkoxy, aldehyl (HC=O), carbonyl, carboxyl or ester group.

Further, the polar CTA(s), if present, is, for example, selected from i) one or more compound(s) containing one or more hydroxyl, alkoxy, HC=O, carbonyl, carboxyl and ester group(s), or a mixture thereof, e.g. one or more alcohol, aldehyde and/or ketone compound(s). The exemplified polar CTA(s), if present, is a straight chain or branched chain alcohol(s), aldehyde(s) or ketone(s) having up to 12 carbon atoms, for example, up to 8 carbon atoms, especially up to 6 carbon atoms, e.g., isopropanol (IPA), methylethylketone (MEK) and/or propionaldehyde (PA).

The amount of the exemplified CTA(s) is not limited and can be tailored by a skilled person within the limits of the invention depending on the desired end properties of the final polymer. Accordingly, the exemplified chain transfer agent(s) can be added in any injection point of the reactor to the polymer mixture. The addition of one or more CTA(s) can be effected from one or more injection point(s) at any time during the polymerization.

In case the polymerization of the polyolefin (b) is carried out in the presence of a CTA mixture comprising one or more polar CTA(s) as described herein and one or more non-polar CTA(s) as described herein, then the feed ratio by weight % of polar CTA to non-polar CTA is, for example, 1 to 99 wt % of polar CTA and
1 to 99 wt % of non-polar CTA, based on the combined amount of the feed of polar CTA and the non-polar CTA into the reactor.

The addition of monomer, comonomer(s) and optional CTA(s) may include and typically includes fresh and recycled feed(s).

The reactor is continuously cooled e.g. by water or steam. The highest temperature is called peak temperature and the reaction starting temperature is called initiation temperature.

Suitable temperatures range up to 400° C., for example, 80 to 350° C. and pressure from 700 bar, for example, 1000 to 4000 bar, e.g. from 1000 to 3500 bar. Pressure can be measured at least after compression stage and/or after the tubular reactor. Temperature can be measured at several points during all steps. High temperature and high pressure generally increase output. Using various temperature profiles selected by a person skilled in the art will allow control of structure of polymer chain, i.e. Long Chain Branching and/or Short Chain branching, density, branching factor, distribution of comonomers, MFR, viscosity, Molecular Weight Distribution etc.

The reactor ends conventionally with a valve a so-called production control valve. The valve regulates reactor pressure and depressurizes the reaction mixture from reaction pressure to separation pressure.

Recovering Step c) of the Process:
Separation:

The pressure is typically reduced to approx 100 to 450 bar and the reaction mixture is fed to a separator vessel where most of the unreacted, often gaseous, products are removed from the polymer stream. Unreacted products comprise e.g. monomer or the optional comonomer(s), and most of the unreacted components are recovered. The polymer stream is optionally further separated at lower pressure, typically less than 1 bar, in a second separator vessel where more of the unreacted products are recovered. Normally low molecular compounds, i.e. wax, are removed from the gas. The gas is usually cooled and cleaned before recycling.

Recovery of the Separated Polymer, i.e. the Polyolefin (b):

After the separation the obtained polymer is typically in a form of a polymer melt which is normally mixed and pelletized in a pelletising section, such as pelletising extruder, arranged in connection to the HP reactor system. Optionally, additive(s), such as antioxidant(s), can be added in this mixer in a known manner to result in the polymer composition.

Further details of the production of ethylene (co)polymers by high pressure radical polymerization can be found i.a. in the Encyclopedia of Polymer Science and Engineering, Vol. 6 (1986), pp 383-410 and Encyclopedia of Materials: Science and Technology, 2001 Elsevier Science Ltd.: "Polyethylene: High-pressure, R. Klimesch, D. Littmann and F.-O. Mähling pp. 7181-7184.

As to polymer properties, e.g. MFR, of the polymerised Polymer, for example, LDPE polymer, the properties can be adjusted by using e.g. chain transfer agent during the polymerisation, or by adjusting reaction temperature or pressure (which also to a certain extent have an influence on the unsaturation level).

When an unsaturated LDPE copolymer of ethylene is prepared, then, as well known, the C—C double bond content can be adjusted by polymerising the ethylene e.g. in the presence of one or more polyunsaturated comonomer(s), chain transfer agent(s), process conditions, or any combinations thereof, e.g. using the desired feed ratio between monomer, e.g. ethylene, and polyunsaturated comonomer and/or chain transfer agent, depending on the nature and amount of C—C double bonds desired for the unsaturated LDPE copolymer. I.a. WO 9308222 describes a high pressure radical polymerisation of ethylene with polyunsaturated monomers, such as an α,ω-alkadienes, to increase the unsaturation of an ethylene copolymer. The non-reacted double bond(s) thus provides i.a. pendant vinyl groups to the formed polymer chain at the site, where the polyunsaturated comonomer was incorporated by polymerization. As a result the unsaturation can be uniformly distributed along the polymer chain in random copolymerisation manner. Also e.g. WO 9635732 describes high pressure radical polymerisation of ethylene and a certain type of polyunsaturated α,ω-divinylsiloxanes. Moreover, as known, e.g. propylene can be used as a chain transfer agent to provide said double bonds.

After the separation the obtained LDPE, i.e. the polyolefin (b), is typically in a form of a polymer melt which is normally mixed and pelletized in a pelletising section, such as pelletising extruder, arranged in connection to the HP reactor system. Optionally, additive(s), such as antioxidant(s), can be added in this mixer in a known manner End Uses and End Applications of the Polymer Composition of Invention The polymer composition of the invention can be used for producing a layer of a power cable, e.g. a direct current (DC) power cable, as described herein.

The invention further provides a power cable, for example, a direct current (DC) power cable, comprising a conductor which is surrounded at least by an inner semiconductive layer, an insulation layer and an outer semiconductive layer, in that order, wherein at least one layer, for example, at least the insulation layer, comprises, e.g. consists of, a polymer composition as described herein comprising a polyolefin (a) which is other than low density polyethylene (LDPE) and a polyolefin (b), which is different from the polyolefin (a).

Accordingly, the inner semiconductive layer of the power cable comprises, for example, consists of, a first semiconductive composition, the insulation layer comprises, e.g. consists of, an insulation composition, and the outer semiconductive layer comprises, for example, consists of, a second semiconductive composition. Thus one of the compositions, e.g. at least the insulation composition comprises, for example, consists of, the polymer composition of the invention.

The term "conductor" means herein that the conductor comprises one or more wires. Moreover, the cable may comprise one or more such conductors. Further, the conductor is, for example, an electrical conductor and comprises one or more metal wires.

The first and the second semiconductive compositions can be different or identical and comprise a polymer(s) which is, for example, a polyolefin or a mixture of polyolefins and a conductive filler, e.g. carbon black. Suitable polyolefin(s) are e.g. polyethylene produced in a low pressure process or a polyethylene produced in a HP process (LDPE). The general polymer description as given herein in relation to the polyolefin (a) and, respectively, in relation to the second optional polyolefin (b) apply also for the suitable polymers for semiconductive layers. The carbon black can be any conventional carbon black used in the semiconductive layers of a power cable, for example, in the semiconductive layer of a DC power cable. Further, the carbon black has, for example, one or more of the following properties: a primary particle size of at least 5 nm which is defined as the number average particle diameter according ASTM D3849-95a, dispersion procedure D, and iodine number of at least 30 mg/g according to ASTM D1510, c) oil absorption number of at least 30 ml/100 g which is measured according to ASTM D2414. Non-limiting examples of carbon blacks are e.g. acetylene carbon black, furnace carbon black and Ketjen carbon black, for example, furnace carbon black and acetylene carbon black. Further, the polymer composition comprises, for example, 10 to 50 wt % carbon black, based on the weight of the Semiconductive composition.

The power cable, for example, the DC power cable, of the invention is, for example, crosslinkable, wherein at least one layer, e.g. at least the insulation layer, comprises, for example, consists of, the polymer composition as described herein comprising a polyolefin (a) which is other than low density polyethylene (LDPE), a polyolefin (b), which is different from the polyolefin (a), as described herein, and a crosslinking agent, e.g. a peroxide in an amount of up to 110 mmol —O—O-/kg polymer composition, for example, up to 90 mmol —O—O-/kg polymer composition, e.g. 1.0 to 75 mmol —O—O-/kg polymer composition, for example, less than 50 mmol —O—O-/kg polymer composition, e.g. less than 40 mmol —O—O-/kg polymer composition, for example, less than 37 mmol —O—O-/kg polymer composition, e.g. less than 35 mmol —O—O-/kg polymer composition, for example, 0.1 to 34 mmol —O—O-/kg polymer composition, e.g. 0.5 to 33 mmol —O—O-/kg polymer composition, for example, 5.0 to 30 mmol —O—O-/kg polymer composition, for example, 7.0 to 30 mmol —O—O-/kg polymer composition, e.g. 10.0 to 30 mmol —O—O-/kg polymer composition.

Naturally, the further exemplified subgroups of the properties described herein, further properties, variants and embodiments as described herein for the polymer composition or for the polyolefin (a) and the polyolefin (b) components thereof apply similarly to the power cable, for example, to the DC power cable, of the invention.

As well known the cable can optionally comprise further layers, e.g. layers surrounding the insulation layer or, if present, the outer semiconductive layers, such as screen(s), a jacketing layer(s), other protective layer(s) or any combinations thereof.

The invention also provides a process for producing a power cable, for example, a DC power cable, as described herein, which is, e.g. crosslinkable, whereby the process comprises the steps of applying on a conductor, for example, by (co)extrusion, at least one layer, e.g. an inner semiconductive layer comprising a first semiconductive composition, an insulation layer comprising an insulation composition and an outer semiconductive layer comprising a second semiconductive composition, in that order, wherein the composition of at least one layer, for example, of the insulation layer comprises, e.g. consists of, the polymer composition comprising a polyolefin (a) which is other than low density polyethylene (LDPE), a polyolefin (b) which is different from the polyolefin (a), as defined herein, and optionally, and, for example, a crosslinking agent, which is, for example, a peroxide in an amount of up to 110 mmol —O—O-/kg polymer composition, e.g. up to 90 mmol —O—O-/kg polymer composition, for example, 0 to 75 mmol —O—O-/kg polymer composition, e.g. less than 50 mmol —O—O-/kg polymer composition, for example, less than 40 mmol —O—O-/kg polymer composition, e.g. less than 37 mmol —O—O-/kg polymer composition, for example, less than 35 mmol —O—O-/kg polymer composition, for example, 0.1 to 34 mmol —O—O-/kg polymer composition, for example, 0.5 to 33 mmol —O—O-/kg polymer composition, for example, 5.0 to 30 mmol —O—O-/kg polymer composition, for example, 7.0 to 30 mmol —O—O-/kg polymer composition, e.g. 10.0 to 30 mmol —O—O-/kg polymer composition. Further, the polymer composition comprises the crosslinking agent and the process comprises a further step of crosslinking at least the polymer composition of said insulation layer, in the presence of the crosslinking agent, for example, in an amount as described herein, at crosslinking conditions, and optionally, and, for example, crosslinking at least one, for example, both, of the first semiconductive composition of the inner semiconductive layer and the second semiconductive composition of the outer semiconductive layer, in the presence of a crosslinking agent at crosslinking conditions.

Further, a crosslinkable DC power cable, for example, a crosslinkable HV DC power cable, is produced, wherein the process comprises the steps of (a)

providing and mixing, for example, melt mixing in an extruder, an optionally, and e.g., crosslinkable first semiconductive composition comprising a polymer, a carbon black and optionally further component(s) for the inner semiconductive layer, providing and mixing, for example, melt mixing in an extruder, a crosslinkable polymer composition of the invention for the insulation layer, providing and mixing, e.g. melt mixing in an extruder, an optionally, and, for example, crosslinkable second semiconductive composition comprising a polymer, a carbon black and optionally further component(s) for the outer semiconductive layer;

(b) applying on a conductor, for example, coextrusion, a melt mix of the first semiconductive composition obtained from step (a) to form the inner semiconductive layer, a melt mix of polymer composition of the invention obtained from step (a) to form the insulation layer, and a melt mix of the second semiconductive composition obtained from step (a) to form the outer semiconductive layer; and (c) optionally crosslinking in the presence of a crosslinking agent and at crosslinking conditions one or more of the polymer composition of the insulation layer, the first semiconductive composition of the inner semiconductive layer and the second semiconductive composition of the outer semiconductive layer, of the obtained cable, for example, at least the polymer composition of the insulation layer, for example, the polymer composition of the insulation layer, the first semiconductive composition of the inner semiconductive layer and the second semiconductive composition of the outer semiconductive layer.

Melt mixing means mixing above the melting point of at least the major polymer component(s) of the obtained mixture and is carried out for example, without limiting to, in a temperature of at least 15° C. above the melting or softening point of polymer component(s).

The term "(co)extrusion" means herein that in case of two or more layers, said layers can be extruded in separate steps, or at least two or all of said layers can be coextruded in a same extrusion step, as well known in the art. The term "(co)extrusion" means herein also that all or part of the layer(s) are formed simultaneously using one or more extrusion heads. For instance a triple extrusion can be used for forming three layers. In case a layer is formed using more than one extrusion heads, then for instance, the layers can be extruded using two extrusion heads, the first one for forming the inner semiconductive layer and the inner part of the insulation layer, and the second head for forming the outer insulation layer and the outer semiconductive layer.

As well known, the polymer composition of the invention and the optional and exemplified first and second semiconductive compositions can be produced before or during the cable production process. Moreover the polymer composition of the invention and the optional and exemplified first and second semiconductive composition can each independently comprise part or all of the component(s) of the final composition, before introducing to the (melt)mixing step of the cable production process.

Further, the polymer composition of the invention and, optionally, the optional first and second semiconductive composition are provided to the cable production process in form of powder, grain or pellets. Pellets mean herein generally any polymer product which is formed from reactor-made polymer (obtained directly from the reactor) by post-reactor modification to solid polymer particles. A well-known post-reactor modification is pelletising a melt mix of a polymer product and optional additive(s) in a pelletising equipment to solid pellets. Pellets can be of any size and shape. Moreover, the polyolefins (a) and (b) can be combined in a same powder, grain or pellet product, which thus contains a solid polymer mixture of the polyolefin (a) and the polyolefin (b). Alternatively and, for example, the polyolefin (a) and the polyolefin (b) are provided separately, e.g. as two separate pellet products, to the cable production process. All or part of the optional additives can be present in any such powder, grain or pellets or added separately.

Accordingly, the polyolefin (a) and the polyolefin (b) of the polymer composition can be premixed, e.g. melt mixed together and pelletised, before providing to the mixing step. Alternatively, and, for example, these components can be provided e.g. in separate pellets to the (melt)mixing step, where the pellets are blended together.

The (melt)mixing step of the provided polymer composition of the invention and of the exemplified first and second semiconductive compositions is, for example, carried out in a cable extruder. The (melt)mixing step of the cable production process may optionally comprise a separate mixing step, e.g. in a mixer arranged in connection and preceding the cable extruder of the cable production line. Mixing in the preceding separate mixer can be carried out by mixing with or without external heating (heating with an external source) of the component(s). In case one of the polyolefin (a) or the polyolefin (b), or the optional and exemplified peroxide(s) and part or all of the optional further component(s), such as further additive(s), of the polymer composition of the invention and, respectively, part or all of the component(s) of the first or second semiconductive compositions, are added to the polyolefin during the cable production process, then the addition(s) can take place at any stage during the (melt)mixing step, e.g at the optional separate mixer preceding the cable extruder or at any point(s) of the cable extruder. The addition of the optional peroxide and optional additive(s) can be made simultaneously or separately as such, for example, in liquid form, or in a well known master batch, and at any stage during the (melt)mixing step.

The polymer composition comprises, for example, a crosslinking agent, which is, for example, peroxide. The crosslinking agent can be added before the cable production process or during the (melt)mixing step. For instance, the crosslinking agent and also the optional further component(s), such as additive(s), can already be present in at least one of the polyolefin (a) or the polyolefin (b) before the use in the production line of the cable production process. The crosslinking agent can be e.g. melt mixed together with the polyolefin (a) or the polyolefin (b), or both, or a mixture thereof, and optional further component(s), and then the melt mix is pelletised. Alternatively, the crosslinking agent is added, for example, impregnated, to the solid polymer particles, e.g. pellets, of the polyolefins or of the polymer composition.

It is exemplified that the melt mix of the polymer composition obtained from melt mixing step consists of the polyolefin (a) and the polyolefin (b) of the invention as the sole polymer components. The optional, additive(s) can be added to polymer composition as such or as a mixture with a carrier polymer, i.e. in a form of so-called master batch.

In an embodiment of the cable production process, a crosslinkable power cable, for example, a crosslinkable DC power cable, e.g. a crosslinkable HV DC power cable, is produced, wherein the insulation layer comprises, for example, consists of, a crosslinkable polymer composition of the invention which comprises a peroxide in an amount as described herein, and wherein the polyolefin (b) is optionally, and, for example, an unsaturated LDPE homo or copolymer, and wherein at least the crosslinkable insulation layer of the obtained cable is crosslinked in step c) at crosslinking conditions. Further in this crosslinkable embodiment, also a crosslinked power cable, for example, a crosslinked DC power cable, e.g. a crosslinked HV DC power cable, is provided.

Crosslinking of the polymer composition of the insulation layer is, for example, carried out in the presence of a peroxide in an amount as described herein, and the optional and exemplified crosslinking of the first semiconductive composition of the inner semiconductive, is carried out in the presence of crosslinking agent(s), for example, in the presence of free radical generating agent(s), which is e.g. a peroxide(s).

The crosslinking agent(s) can already be present in the optional first and second semiconductive composition before introducing to the crosslinking step c) or introduced during the crosslinking step. Peroxide is an exemplified crosslinking agent for said optional first and second semiconductive compositions and is, for example, included to the pellets of semiconductive composition before the composition is used in the cable production process as described herein.

Crosslinking can be carried out at increased temperature which is chosen, as well known, depending on the type of crosslinking agent. For instance temperatures above 150° C., such as from 160 to 350° C., are typical, however without limiting thereto.

A further embodiment of the present invention discloses a crosslinked polymer composition, wherein a polymer composition is exposed to a curing procedure during which the maximum temperature of said polymer composition is, for example, above 150° C., e.g. 160 to 350° C., e.g. less than 280° C., e.g. 250° C. or less, or, for example, 180° C. or less.

An even further embodiment of the present invention discloses a crosslinked polymer composition, wherein a polymer composition is exposed to a curing procedure during which the maximum temperature of said polymer composition is 270° C. or less, 260° C. or less, 250° C. or less, 240° C. or less, 230° C. or less, 220° C. or less, 210° C. or less, 200° C. or less, 190° C. or less, or, alternatively, 180° C. or less.

Still a further embodiment of the present invention discloses a crosslinked polymer composition, wherein a polymer composition is exposed to a curing procedure during which the maximum temperature of said polymer composition is 270° C. or less, 265° C. or less, 260° C. or less, 255° C. or less, 250° C. or less, 245° C. or less, 240° C. or less, 235° C. or less, 230° C. or less, 225° C. or less, 220° C. or less, 215° C. or less, 210° C. or less, 205° C. or less, 200° C. or less, 195° C. or less, 190° C. or less, 185° C. or less, or, alternatively, 180° C. or less.

An even further embodiment of the present invention discloses a crosslinked polymer composition, wherein a polymer composition is exposed to a curing procedure during which the maximum temperature of said polymer composition is 250° C. or less, 245° C. or less, 240° C. or less, 235° C. or less, 230° C. or less, 225° C. or less, 220° C. or less, 215° C. or less, 210° C. or less, 205° C. or less, 200° C. or less, 195° C. or less, 190° C. or less, 185° C. or less, or, alternatively, 180° C. or less.

A further embodiment of the present invention discloses a crosslinked polymer composition, wherein a polymer composition is exposed to a curing procedure during which the maximum temperature of said polymer composition is 180° C. or less.

Still a further embodiment of the present invention discloses a crosslinked polymer composition, wherein a polymer composition is exposed to a curing procedure during which the maximum temperature of said polymer composition is at least 150° C. or, alternatively, at least 160° C.

The processing temperatures and devices are well known in the art, e.g. conventional mixers and extruders, such as single or twin screw extruders, are suitable for the process of the invention.

The invention further provides a crosslinked power cable, e.g. a direct current (DC) power cable, for example, a crosslinked HV DC power cable, where the inner semiconductive layer comprises, e.g. consists of, an optionally crosslinked first semiconductive composition, the polymer composition of the insulation layer comprises, for example, consists of, a crosslinked polymer composition of the invention as described herein, and the outer semiconductive layer comprises, for example, consists of, an optionally crosslinked second semiconductive composition, e.g. where the inner semiconductive layer comprises, for example, consists of, a crosslinked first semiconductive composition, the polymer composition of the insulation layer comprises, for example, consists of, a crosslinked polymer composition as described herein, and the outer semiconductive layer comprises, for example, consists of, an optionally crosslinked, for example, a crosslinked second semiconductive composition.

The non-crosslinked, or e.g. crosslinked, power cable comprising the non-crosslinked, or e.g. crosslinked, polymer composition of the invention in at least one cable layer, for example, in an insulation layer, has, i.a.

The advantageous electrical properties,
If the polymer composition of the invention is crosslinked, then the exemplified low peroxide content prior crosslinking enables robust high speed extrusion possible leading to longer stable production periods at higher extrusion speed and quality due to lowered (or no) risk to scorching (undesired premature crosslinking) of the polymer composition in the extruder and/or in the layer(s),
If the polymer composition of the invention is crosslinked, then the exemplified low peroxide content results in lesser amounts of any undesired by-products, i.e. decomposition products, formed from the crosslinking agent. Thus, any degassing step can be reduced, which would accelerate the overall cable production process,
The power cable, when non-crosslinked or crosslinked with the exemplified lower peroxide content, has good mechanical properties and thermal crack initiation properties, expressed as TSCR (Thermal stress cracking), which, unexpectedly, are sufficient for DC cable applications.

The exemplified DC power cable of the invention is a HV DC power cable, e.g., the HV DC power cable operates at voltages, as described herein, for HV DC cable or extra HV DC cable, depending on the desired end cable application.

Moreover, the power cable, for example, the DC power cable, e.g., the HV DC power cable, of the invention is crosslinked as described herein.

The thickness of the insulation layer of the DC power cable, e.g., of the HV DC power cable, is typically 2 mm or, for example, at least 3 mm, for example, 5 to 100 mm, e g 5 to 50 mm, and conventionally 5 to 40 mm, e.g. 5 to 35 mm, when measured from a cross section of the insulation layer of the cable. The thickness of the inner and outer semiconductive layers is typically less than that of the insulation layer, and in HV DC power cables can be e.g. more than 0.1 mm, such as from 0.3 up to 20 mm, 0.3 to 10 of inner semiconductive and outer semiconductive layer. The thickness of the inner semiconductive layer is e.g. 0.3-5.0 mm, for example, 0.5-3.0 mm, for example, 0.8-2.0 mm. The thickness of the outer semiconductive layer is e.g. from 0.3 to 10 mm, such as 0.3 to 5 mm, for example, 0.5 to 3.0 mm, for example, 0.8-3.0 mm. It is evident for and within the skills of a skilled person that the thickness of the layers of the DC cable depends on the intended voltage level of the end application cable and can be chosen accordingly.

EXAMPLES

Determination Methods

Unless otherwise stated in the description or experimental part the following methods were used for the property determinations.
Wt %: % by Weight
Melt Flow Rate The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylene and at 230° C. for polypropylene. MFR may be determined at different loadings such as 2.16 kg ($MFR_2$) or 21.6 kg ($MFR_{21}$).
Molecular Weight Mz, Mw, Mn, and MWD are measured by Gel Permeation Chromatography (GPC) according to the following method:

The weight average molecular weight Mw and the molecular weight distribution (MWD=Mw/Mn wherein Mn is the number average molecular weight and Mw is the weight average molecular weight; Mz is the z-average molecular weight) is measured according to ISO 16014-4: 2003 and ASTM D 6474-99. A Waters GPCV2000 instrument, equipped with refractive index detector and online viscosimeter was used with 2×GMHXL-HT and 1×G7000HXL-HT TSK-gel columns from Tosoh Bioscience and 1,2,4-trichlorobenzene (TCB, stabilized with 250 mg/L 2,6-Di tert-butyl-4-methyl-phenol) as solvent at 140° C. and at a constant flow rate of 1 mL/min. 209.5 μL of sample solution were injected per analysis. The column set was calibrated using universal calibration (according to ISO 16014-2:2003) with at least 15 narrow MWD polystyrene (PS) standards in the range of 1 kg/mol to 12 000 kg/mol. Mark Houwink constants were used as given in ASTM D 6474-99. All samples were prepared by dissolving 0.5-4.0 mg of polymer in 4 mL (at 140° C.) of stabilized TCB (same as mobile phase) and keeping for max. 3 hours at a maximum temperature of 160° C. with continuous gentle shaking prior sampling in into the GPC instrument.
Comonomer Contents
a) Comonomer Content in Random Copolymer of Polypropylene:

Quantitative Fourier transform infrared (FTIR) spectroscopy was used to quantify the amount of comonomer. Calibration was achieved by correlation to comonomer contents determined by quantitative nuclear magnetic resonance (NMR) spectroscopy.

The calibration procedure based on results obtained from quantitative $^{13}$C-NMR spectroscopy was undertaken in the conventional manner well documented in the literature. The amount of comonomer (N) was determined as weight percent (wt %) via:

$$N = k1(A/R) + k2$$

wherein A is the maximum absorbance defined of the comonomer band, R the maximum absorbance defined as peak height of the reference peak and with k1 and k2 the linear constants obtained by calibration. The band used for ethylene content quantification is selected depending if the ethylene content is random (730 cm$^{-1}$) or block-like (as in heterophasic PP copolymer) (720 cm$^{-1}$). The absorbance at 4324 cm$^{-1}$ was used as a reference band.

b) Quantification of Alpha-Olefin Content in Linear Low Density Polyethylenes and Low Density Polyethylenes by NMR Spectroscopy:

The comonomer content was determined by quantitative 13C nuclear magnetic resonance (NMR) spectroscopy after basic assignment (J. Randall JMS—Rev. Macromol. Chem. Phys., C29(2&3), 201-317 (1989). Experimental parameters were adjusted to ensure measurement of quantitative spectra for this specific task.

Specifically solution-state NMR spectroscopy was employed using a Bruker AvanceIII 400 spectrometer. Homogeneous samples were prepared by dissolving approximately 0.200 g of polymer in 2.5 ml of deuterated-tetrachloroethene in 10 mm sample tubes utilising a heat block and rotating tube oven at 140 C. Proton decoupled 13 C single pulse NMR spectra with NOE (powergated) were recorded using the following acquisition parameters: a flip-angle of 90 degrees, 4 dummy scans, 4096 transients an acquisition time of 1.6 s, a spectral width of 20 kHz, a temperature of 125° C., a bilevel WALTZ proton decoupling scheme and a relaxation delay of 3.0 s. The resulting FID was processed using the following processing parameters: zero-filling to 32 k data points and apodisation using a gaussian window function; automatic zeroth and first order phase correction and automatic baseline correction using a fifth order polynomial restricted to the region of interest.

Quantities were calculated using simple corrected ratios of the signal integrals of representative sites based upon methods well known in the art.

c) Comonomer Content of Polar Comonomers in Low Density Polyethylene (1) Polymers Containing >6 wt. % Polar Comonomer Units Comonomer content (wt %) was determined in a known manner based on Fourier transform infrared spectroscopy (FTIR) determination calibrated with quantitative nuclear magnetic resonance (NMR) spectroscopy. Below is exemplified the determination of the polar comonomer content of ethylene ethyl acrylate, ethylene butyl acrylate and ethylene methyl acrylate. Film samples of the polymers were prepared for the FTIR measurement: 0.5-0.7 mm thickness was used for ethylene butyl acrylate and ethylene ethyl acrylate and 0.10 mm film thickness for ethylene methyl acrylate in amount of >6 wt %. Films were pressed using a Specac film press at 150° C., approximately at 5 tons, 1-2 minutes, and then cooled with cold water in a not controlled manner. The accurate thickness of the obtained film samples was measured.

After the analysis with FTIR, base lines in absorbance mode were drawn for the peaks to be analysed. The absorbance peak for the comonomer was normalised with the absorbance peak of polyethylene (e.g. the peak height for butyl acrylate or ethyl acrylate at 3450 cm$^{-1}$ was divided with the peak height of polyethylene at 2020 cm$^{-1}$). The NMR spectroscopy calibration procedure was undertaken in the conventional manner which is well documented in the literature, explained below.

For the determination of the content of methyl acrylate a 0.10 mm thick film sample was prepared. After the analysis the maximum absorbance for the peak for the methylacrylate at 3455 cm$^{-1}$ was subtracted with the absorbance value for the base line at 2475 cm$^{-1}$ ($A_{methylacrylate}-A_{2475}$). Then the maximum absorbance peak for the polyethylene peak at 2660 cm$^{-1}$ was subtracted with the absorbance value for the base line at 2475 cm$^{-1}$ ($A_{2660}-A_{2475}$). The ratio between ($A_{methylacrylate}-A_{2475}$) and ($A_{2660}-A_{2475}$) was then calculated in the conventional manner which is well documented in the literature.

The weight-% can be converted to mol-% by calculation. It is well documented in the literature.

Quantification of Copolymer Content in Polymers by NMR Spectroscopy

The comonomer content was determined by quantitative nuclear magnetic resonance (NMR) spectroscopy after basic assignment (e.g. "NMR Spectra of Polymers and Polymer Additives", A. J. Brandolini and D. D. Hills, 2000, Marcel Dekker, Inc. New York). Experimental parameters were adjusted to ensure measurement of quantitative spectra for this specific task (e.g "200 and More NMR Experiments: A Practical Course", S. Berger and S. Braun, 2004, Wiley-VCH, Weinheim). Quantities were calculated using simple corrected ratios of the signal integrals of representative sites in a manner known in the art.

(2) Polymers Containing 6 wt. % or Less Polar Comonomer Units

Comonomer content (wt. %) was determined in a known manner based on Fourier transform infrared spectroscopy (FTIR) determination calibrated with quantitative nuclear magnetic resonance (NMR) spectroscopy. Below is exemplified the determination of the polar comonomer content of ethylene butyl acrylate and ethylene methyl acrylate. For the FT-IR measurement a film samples of 0.05 to 0.12 mm thickness were prepared as described herein under method 1). The accurate thickness of the obtained film samples was measured.

After the analysis with FT-IR base lines in absorbance mode were drawn for the peaks to be analysed. The maximum absorbance for the peak for the comonomer (e.g. for methylacrylate at 1164 cm$^{-1}$ and butylacrylate at 1165 cm$^{-1}$) was subtracted with the absorbance value for the base line at 1850 cm$^{-1}$ ($A_{polar\ comonomer}-A_{1850}$). Then the maximum absorbance peak for polyethylene peak at 2660 cm$^{-1}$ was subtracted with the absorbance value for the base line at 1850 cm$^{-1}$ ($A_{2660}-A_{1850}$). The ratio between ($A_{comonomer}-A_{1850}$) and (A2660–A1850 was then calculated. The NMR spectroscopy calibration procedure was undertaken in the conventional manner which is well documented in the literature, as described herein under method 1).

The weight-% can be converted to mol-% by calculation. It is well documented in the literature.

Below is exemplified how polar comonomer content obtained from the method (1) or (2) as described herein, depending on the amount thereof, can be converted to micromol or mmol per g polar comonomer as used in the definitions as described herein:

The millimoles (mmol) and the micro mole calculations have been done as described herein.

For example, if 1 g of the poly(ethylene-co-butylacrylate) polymer, which contains 20 wt % butylacrylate, then this material contains $0.20/M_{butylacrylate}$ (128 g/mol)=1.56×10$^{-3}$ mol. (=1563 micromoles).

The content of polar comonomer units in the polar copolymer $C_{polar\ comonomer}$ is expressed in mmol/g (copolymer). For example, a polar poly(ethylene-co-butylacrylate) polymer which contains 20 wt. % butyl acrylate comonomer units has a $C_{polar\ comonomer}$ of 1.56 mmol/g. The used molecular weights are: $M_{butylacrylate}$=128 g/mole, $M_{ethylacrylate}$=100 g/mole, $M_{methylacrylate}$=86 g/mole).

Density

Low density polyethylene (LDPE): The density was measured according to ISO 1183-2. The sample preparation was executed according to ISO 1872-2 Table 3 Q (compression moulding).

Low pressure process polyethylene: Density of the polymer was measured according to ISO 1183/1872-2B.

Xylene Solubles (XS)

Xylene solubles were determined at 23° C. according ISO 6427.

Method for Determination of the Amount of Double Bonds in the Polymer Composition or in the Polymer Quantification of the Amount of Carbon-Carbon Double Bonds by IR Spectroscopy Quantitative infrared (IR) spectroscopy was used to quantify the amount of carbon-carbon double bonds (C=C). Specifically solid-state transmission FTIR spectroscopy was used (Perkin Elmer 2000). Calibration was achieved by prior determination of the molar extinction coefficient of the C=C functional groups in representative low molecular weight model compounds of know structure.

The amount of a given C=C functional group containing species (N) was defined as number of carbon-carbon double bonds per thousand total carbon atoms (C=C/1000C) according to:

$$N=(A\times 14)/(E\times L\times D)$$

where A is the maximum absorbance defined as peak height, E the molar extinction coefficient of the group in question (1·mol$^{-1}$·mm$^{-1}$), L the film thickness (mm) and D the density of the material (g·cm$^{-1}$).

For systems containing unsaturation three types of C=C containing functional groups were considered, each with a characteristic C=C—H out-of-plain bending vibrational mode, and each calibrated to a different model compound resulting in individual extinction coefficients:

vinyl (R—CH=CH2) via at around 910 cm−1
based on 1-decene [dec-1-ene] giving E=13.13 1·mol−1·mm−1
vinylidene (RR'C=CH2) at around 888 cm−1
based on 2-methyl-1-heptene [2-methyhept-1-ene] giving E=18.24 1·mol−1·mm−1
trans-vinylene (R—CH=CH—R') at around 965 cm−1
based on trans-4-decene [(E)-dec-4-ene] giving E=15.14 1·mol−1·mm−1

The specific wavenumber of this absorption was dependant on the specific chemical structure of the species. When non-aliphatic unsaturated group were addressed the molar extinction coefficient was taken to be the same as that of their related aliphatic unsaturated group, as determined using the aliphatic small molecule analogue.

The molar extinction coefficient was determined according to the procedure given in ASTM D3124-98 and ASTM D6248-98. Solution-state infrared spectra were recorded on standard solutions using a FTIR spectrometer (Perkin Elmer 2000) equipped with a 0.1 mm path length liquid cell at a resolution of 4 cm$^{-1}$. The molar extinction coefficient (E) was determined as 1·mol$^{-1}$·mm$^{-1}$ via:

$$E=A/(C\times L)$$

where A is the maximum absorbance defined as peak height, C the concentration (mol·1$^{-1}$) and L the cell thickness (mm). At least three 0.18 mol·1$^{-1}$ solutions in carbondisulphide ($CS_2$) were used and the mean value of the molar extinction coefficient determined.

DC Conductivity Method

The plaques are compression moulded from pellets of the test polymer composition. The final plaques consist of the test polymer composition and have a thickness of 1 mm and a diameter of 330 mm.

The conductivity measurement can be performed using a test polymer composition which does not comprise or comprises the optional crosslinking agent. In case of no crosslinking agent the conductivity is measured from a non-crosslinked plaque sample using the below procedure. If the test polymer composition comprises the crosslinking agent, then the crosslinking occurs during the preparation of the plaque samples, whereby the conductivity is then measured according to the below procedure from the resulting crosslinked plaque sample. Crosslinking agent, if present in the polymer composition prior to crosslinking, is e.g. a peroxide, as herein.

The plaques are press-moulded at 130° C. for 12 min while the pressure is gradually increased from 2 to 20 MPa. Thereafter the temperature is increased and reaches 180° C., or alternatively 250° C., after 5 min. The temperature is then kept constant at 180° C., or alternatively 250° C., for 15 min during which the plaque becomes fully crosslinked by means of the peroxide, if present in the test polymer composition. Finally the temperature is decreased using the cooling rate 15° C./min until room temperature is reached when the pressure is released. The plaques are immediately after the pressure release wrapped in metallic foil in order to prevent loss of volatile substances.

A high voltage source is connected to the upper electrode, to apply voltage over the test sample. The resulting current through the sample is measured with an electrometer. The measurement cell is a three electrodes system with brass electrodes. The brass electrodes are equipped with heating pipes connected to a heating circulator, to facilitate measurements at elevated temperature and provide uniform temperature of the test sample. The diameter of the measurement electrode is 100 mm. Silicone rubber skirts are placed between the brass electrode edges and the test sample, to avoid flashovers from the round edges of the electrodes.

The applied voltage was 30 kV DC meaning a mean electric field of 30 kV/mm. The temperature was 70° C. The current through the plaque was logged throughout the whole experiments lasting for 24 hours. The current after 24 hours was used to calculate the conductivity of the insulation.

This method and a schematic picture of the measurement setup for the conductivity measurements has been thoroughly described in a publication presented at the Nordic Insulation Symposium 2009 (Nord-IS 09), Gothenburg, Sweden, Jun. 15-17, 2009, page 55-58: Olsson et al, "Experimental determination of DC conductivity for XLPE insulation".

Experimental Part

Experimental:

Preparation of the Components of the Polymer Compositions of the Present Invention and of the References The polyolefins were low density polyethylene produced in a high pressure reactor, and high density polyethylene produced in a gas phase reactor. The production of inventive and reference polymers is described herein.

LDPE:

Purified ethylene was liquefied by compression and cooling to a pressure of 90 bars and a temperature of −30° C. and split up into to two equal streams of roughly 14 tons/hour each. The CTA (methyl ethyl ketone (MEK)), air and a commercial peroxide radical initiator dissolved in a solvent were added to the two liquid ethylene streams in individual amounts. The two mixtures were separately pumped through an array of 4 intensifiers to reach pressures of around 2100-2300 bars and exit temperatures of around 40° C. These two streams were respectively fed to the front (zone 1) (50%) and side (zone 2) (50%) of a split-feed two-zone tubular reactor. MEK was added in amounts of 226 kg/h to the front stream to maintain a $MFR_2$ of around 2 g/10 min. The front feed stream was passed through a heating section to reach a temperature sufficient for the exothermal polymerization reaction to start. The reaction reached peak temperatures were 251° C. and 330° C. in the first and second zones, respectively. The side feed stream cooled the reaction to an initiation temperature of the second zone of 165-170° C. Air and peroxide solution was added to the two streams in enough amounts to reach the target peak temperatures. The reaction mixture was depressurized by product valve, cooled and polymer was separated from unreacted gas.

Compounding of the Polymer Compositions:

Each polymer component of a test polymer composition were added as separate pellets to a pilot scale extruder (Prism TSE 24TC) together with additives, if not present in the pellets, other than the crosslinking agent. The obtained mixture was melt mixed in conditions given in the below table and extruded to pellets in a conventional manner.

| Set Values Temperatures [° C.] | | | | | | Extruder | | | |
| --- | --- | --- | --- | --- | --- | --- | --- | --- | --- |
| Zone 1 | Zone 2 | Zone 3 | Zone 4 | Zone 5 | Zone 6 | rpm | Output [kg/h] | Pressure [bar] | Filter [mesh] |
| 80 | 155 | 165 | 175 | 175 | 180 | 225 | 7.5 | 60 | 325 |

The crosslinking agent, herein peroxide, if present, was added on to the pellets and the resulting pellets were used for the experimental part. The amounts of polymer component(s), peroxide, additives (AO) are given in table 2.

TABLE 2

Polymer compositions of the invention and reference compositions and the electrical conductivity results:

| Components | Inv. comp1 | Inv. comp2 | Ref 1 |
| --- | --- | --- | --- |
| LDPE, i.e. polyolefin (b), wt %* | 90 | 80 | 100 |
| Compressor lubricant used in the LDPE polymerisation process | PAG, of which 20-200 ppm has gone into LDPE, i.e. polyolefin (b) | PAG, of which 20-200 ppm has gone into LDPE, i.e. polyolefin (b) | PAG, of which 20-200 ppm has gone into LDPE, i.e. polyolefin (b) |
| HDPE, i.e. polyolefin (a), wt %* | 10 | 20 | 0 |
| AO, wt %** | 0.08 | 0.08 | 0.08 |
| Crosslinking agent, mmol —O—O—/kg polymer composition (wt % **) | 21 (0.55) | 21 (0.55) | 21 (0.55) |
| Electrical properties | | | |
| DC conductivity Method, 1 mm plaque (fS/m), crosslinking at 180° C. | 25.8 | 27.2 | 128 |
| Method, 1 mm plaque (fS/m), crosslinking at 250° C. | 41.4 | 11.7 | 191 |

Crosslinking agent: Dicumylperoxide (CAS no. 80-43-3)
AO: Antioxidant: 4,4'-thiobis (2-tertbutyl-5-methylphenol) (CAS no. 96-69-5)
*The amounts of polymer components in table are based on the combined amount of the used polymer components. The amount 100 wt % of polymer component in table 1 means that the polymer is the sole polymer component.
**The amounts of peroxide (wt %) and AO are based on the final composition.

TABLE 1

Polymer properties of LDPE

| Base Resin Properties | LDPE |
| --- | --- |
| MFR 2.16 kg, at 190° C. [g/10 min] | 1.90 |
| Density [kg/m³] | 922 |
| Vinyl [C═C/1000 C.] | 0.33 |
| Vinylidene [C═C/1000 C.] | 0.27 |
| Trans-vinylene [C═C/1000 C.] | 0.07 |

HDPE:

A conventional unimodal high density polyethylene (0.8 mol % 1-butene content, as the comonomer) which is produced in a gas phase reactor. The HDPE has an $MFR_2$ of 12 g/10 min (190° C./2.16 kg) and a density of 962 kg/m³. The same base resin, except that combined with another additive system than specified in table 2, is used in a commercially available grade Bormed HE9621-PH (supplier Borealis).

The table 2 shows that the DC conductivity of the non-degassed inventive compositions are advantageously low, see the Inventive composition 1 and 2 which both have clearly lower DC conductivity than the reference with the same LDPE. The test results show further that the polymer composition of the present invention comprising a non-mineral oil maintains an advantageously low DC conductivity when the polymer composition further comprises HDPE, i.e. the polyolefin (a), which is other than low density polyethylene (LDPE).

In general, the table 2 shows that the polymer composition of the invention is highly advantageous for power cable, e.g. for DC cable, for example, for HV DC cable applications.

The invention claimed is:
1. A polymer composition comprising
   a polyolefin (a), a peroxide and an inorganic filler (b)
      wherein the polyolefin (a) is obtainable by a high pressure process which process comprises the steps:
      (i) compressing one or more monomer(s) under pressure in a compressor, using a compressor lubricant for lubrication,

(ii) polymerising a monomer optionally together with one or more comonomer(s) in a polymerisation zone, (iii) separating the obtained polyolefin (a) from the unreacted products and recovering the separated polyolefin (a) in a recovery zone, wherein in step (i) the compressor lubricant comprises a non-mineral oil; and wherein the polyolefin (a) is an unsaturated LDPE polymer, which is selected from an unsaturated LDPE homopolymer or an unsaturated LDPE copolymer of ethylene with one or more comonomer(s), and comprises vinyl groups in total amount of more than 0.20/1000 carbon atoms, wherein the amount of the inorganic filler (b) is 0.1 to 5.0 wt % based on the combined amount of the polyolefin (a) and the inorganic filler (b);

wherein the polyolefin (a) comprises 10 to 250 ppm of the non-mineral oil; and wherein the polymer composition comprises peroxide in an amount of 5.0 to less than 40 mmol —O—O-/kg of the polymer composition.

2. A polymer composition according to claim 1, wherein the non-mineral oil is polyalkylene glycol (PAG).

3. A polymer composition according to claim 1, wherein the polymer composition has an electrical conductivity of 140 fS/m or less, for example, of 135 fS/m or less, for example, of 130 fS/m or less, for example, of 125 fS/m or less, for example, of 120 fS/m or less, for example, of 115 fS/m or less, for example, of from 0.01 to 110 fS/m or less, for example, of from 0.05 to 105 fS/m or less, when measured according to DC conductivity method using a 1 mm thick plaque sample as described under "Determination Methods."

4. A polymer composition according to claim 1, wherein the amount of polyolefin (a) in the polymer composition of the invention is typically of at least 35 wt %, for example, at least 40 wt %, e.g. at least 50 wt %, for example, at least 75 wt %, e.g. 80 to 100 wt % or, for example, 85 to 100 wt %, of the total weight of the polymer component(s) present in the polymer composition, e.g. the amount of the polyolefin (a) is 70 wt % or, for example, 80 wt % or, e.g. 85 to 99.95 wt %, for example, 90.0 to 99.9 wt %, e.g. 95.0 to 99.9 wt %, for example, 96.0 to 99.9 wt %, based on the combined amount of the polyolefin (a) and the inorganic filler (b).

5. A polymer composition according to claim 1, wherein the amount of the inorganic filler (b) is 0.1 to 4.0 wt %, based on the combined amount of the polyolefin (a) and the inorganic filler (b).

6. A polymer composition according to claim 1, wherein the polyolefin (a) is a polyethylene, for example a polyethylene selected from a polyethylene polymerised in the presence of an olefin polymerisation catalyst and selected from an ethylene homopolymer or a copolymer of ethylene with one or more comonomer(s); or a polyethylene polymerised in a high pressure polymerisation process and, for example in the presence of an initiator(s), e.g. a low density polyethylene (LDPE) polymer polymerised in a high pressure polymerisation process and in the presence of an intiator(s), for example an LDPE selected from an optionally unsaturated LDPE homopolymer or an optionally unsaturated LDPE copolymer of ethylene with one or more comonomer(s), e.g. an LDPE selected from an optionally unsaturated LDPE homopolymer or an optionally unsaturated LDPE copolymer of ethylene with one or more comonomer(s).

7. A polymer composition according to claim 1, wherein the polyolefin(a) is an unsaturated LDPE copolymer of ethylene with at least one polyunsaturated comonomer and optionally with one or more other comonomer(s), the polyunsaturated comonomer consists, for example, of a straight carbon chain with at least 8 carbon atoms and at least 4 carbons between the non-conjugated double bonds, of which at least one is terminal, e.g., said polyunsaturated comonomer is a diene, for example a diene which comprises at least eight carbon atoms, the first carbon-carbon double bond being terminal and the second carbon-carbon double bond being non-conjugated to the first one, for example, a diene which is selected from C8- to C14-non-conjugated diene or mixtures thereof, e.g. selected from 1,7-octadiene, 1,9-decadiene, 1,11-dodecadiene, 1,13-tetradecadiene, 7-methyl-1,6-octadiene, 9-methyl-1,8-decadiene, or mixtures thereof, for example, from 1,7-octadiene, 1,9-decadiene, 1,11-dodecadiene, 1,13-tetradecadiene, or any mixture thereof.

8. A polymer composition according to claim 1, wherein the inorganic filler (b) is selected from inorganic oxides, hydroxides, carbonates, nitrides, carbides, kaolin clay, talc, borates, alumina, titania or titanates, silica, silicates, zirconia, glass fibers, glass particles, or any mixtures thereof.

9. A polymer composition according to claim 1, wherein the inorganic filler (b) is selected from inorganic oxides, nitrides, carbides, kaolin clay, talc, borates, alumina, titania or titanates, silica, silicates, zirconia, glass fibers, glass particles, or any mixtures thereof, the inorganic filler (b) is, for example an inorganic oxide, e.g. an inorganic oxide selected from $SiO_2$, MgO, TiO2 or ZnO, or any mixtures thereof, for example from $SiO_2$, TiO2 or MgO, or any mixtures thereof.

10. A polymer composition according to claim 1, wherein the polymer composition comprises crosslinking agent in an amount of 5.0 to less than 37 mmol —O—O-/kg polymer composition, e.g. less than 35 mmol —O—O-/kg polymer composition, for example of 0.1 to 34 mmol —O—O-/kg polymer composition, e.g. of 0.5 to 33 mmol —O—O-/kg polymer composition, for example from 5.0 to 30 mmol —O—O-/kg polymer composition, e.g. from 7.0 to 30 mmol —O—O-/kg polymer composition, for example from 10.0 to 30 mmol —O—O-/kg polymer composition.

11. A power cable, for example a direct current (DC) power cable, comprising a conductor which is surrounded at least by an inner semiconductive layer, an insulation layer and an outer semiconductive layer, in that order, wherein at least one layer, for example at least the insulation layer, comprises a polymer composition according to claim 1.

12. A process for producing a DC power cable, wherein the process comprises the steps of applying on a conductor, for example, by (co)extrusion, an inner semiconductive layer comprising a first semiconductive composition, an insulation layer comprising an insulation composition and an outer semiconductive layer comprising a second semiconductive composition, in that order, wherein the insulation composition of the insulation layer comprises a polymer composition according to claim 1.

13. A polymer composition according to claim 9, wherein the inorganic filler (b) is MgO.

* * * * *